United States Patent
Landon et al.

(10) Patent No.: US 9,613,233 B1
(45) Date of Patent: Apr. 4, 2017

(54) INTERACTIVE INDUSTRIAL MAINTENANCE, TESTING, AND OPERATION PROCEDURES

(71) Applicant: Marking Services Incorporated, Milwaukee, WI (US)

(72) Inventors: Clint Wayne Landon, San Angelo, TX (US); Jeff Keith Dickinson, River Hills, WI (US)

(73) Assignee: Marking Services Incorporated, Milwaukee, WI (US)

( * ) Notice: Subject to any disclaimer, the term of this patent is extended or adjusted under 35 U.S.C. 154(b) by 0 days.

(21) Appl. No.: 15/231,260

(22) Filed: Aug. 8, 2016

(51) Int. Cl.
| | |
|---|---|
| G06F 19/00 | (2011.01) |
| G06K 7/00 | (2006.01) |
| G06K 19/06 | (2006.01) |
| G06K 7/14 | (2006.01) |
| G06K 7/10 | (2006.01) |
| G06Q 10/08 | (2012.01) |

(52) U.S. Cl.
CPC ....... *G06K 7/0004* (2013.01); *G06K 7/10732* (2013.01); *G06K 7/1417* (2013.01); *G06K 7/1473* (2013.01); *G06K 19/06037* (2013.01); *G06Q 10/087* (2013.01)

(58) Field of Classification Search
CPC ........... G06K 7/10722; G06K 7/10792; G06K 7/10712; G06K 7/10851; G06K 7/12; G06K 17/0022; G06K 19/06028; G06K 19/06037; G06K 19/06046; G06K 19/086; G06K 19/10; G06K 9/00577
USPC .................................................. 235/376, 385
See application file for complete search history.

(56) References Cited

U.S. PATENT DOCUMENTS

| | | | |
|---|---|---|---|
| 6,643,555 B1 | 11/2003 | Eller et al. | |
| 7,418,259 B2* | 8/2008 | Juntunen | H04M 19/04 455/414.1 |
| 8,000,814 B2 | 8/2011 | Havekost et al. | |
| 8,356,257 B2 | 1/2013 | Husoy et al. | |
| 8,626,874 B2* | 1/2014 | Kaplan | G06Q 10/06 709/219 |
| 2002/0080032 A1 | 6/2002 | Smith et al. | |

(Continued)

OTHER PUBLICATIONS

Autodesk Inc., "Autodesk Recap 360", https://knowledge.autodesk.com/support/recap, Date Retrieved: Aug. 24, 2016, 3 pages.

(Continued)

*Primary Examiner* — Seung Lee
(74) *Attorney, Agent, or Firm* — Michael Best & Friedrich LLP

(57) ABSTRACT

A method of performing an interactive procedure with a portable smart device utilizes assets that include asset identifiers in an industrial facility. The method provides indicia and/or photographs on a display of the portable smart device for procedural steps of a procedure to be performed on an industrial facility. The portable smart device receives an input to begin the procedure, displays indicia and/or photographs of an asset location and a first procedural step for an asset having an asset identifier. The portable smart device scans an asset identifier to ensure the proper asset is located. Thereafter, a procedural step for the asset is displayed. Upon performance of the step, an operator provides a confirmation to the smart device for ensuring that the procedural step is performed.

20 Claims, 19 Drawing Sheets

(56) References Cited

U.S. PATENT DOCUMENTS

| | | | |
|---|---|---|---|
| 2004/0024662 A1 | 2/2004 | Gray et al. | |
| 2004/0130564 A1* | 7/2004 | Smith | G06F 9/4443 |
| | | | 715/705 |
| 2007/0201373 A1* | 8/2007 | Williams | G06F 9/4446 |
| | | | 370/241 |
| 2014/0303754 A1 | 10/2014 | Nixon et al. | |
| 2014/0343911 A1 | 11/2014 | Dallmann et al. | |
| 2015/0302650 A1* | 10/2015 | Abdelmoati | G06F 3/041 |
| | | | 345/633 |

OTHER PUBLICATIONS

Autodesk Inc., "Recap 360: Reality Capture and 3D Scanning Software", http://www.autodesk.com/products/recap-360/overview, Date Retrieved: Aug. 24, 2016, 7 pages.

Autodesk Inc., "Features: Reality Capture and 3D Scanning Software", http://www.autodesk.com/products/recap-360/features/all, Date Retrieved: Aug. 24, 2016, 16 pages.

Autodesk Inc., "Features: Point Cloud Software for 3D Laser Scanning", http://www.autodesk.com/products/recap-360/features/laser-scan-features, Date Retrieved: Aug. 30, 2016, 16 pages.

Autodesk Inc., "New Feature: Auto Registration", online video clip, http://videos.autodesk.com/zencoder/content/dam/autodesk/www/products/recap360/video/automatic-registration-video-896x504.mp4, Date Retrieved: Aug. 30, 2016, 7 screenshot pages.

FARO Technologies, Inc., "PointSense—Postprocessing of 3D Laser Data Within AutoCAD", http://faro-3d-software.com/CAD/Products/PointSense/index.php, Date Retrieved: Aug. 24, 2016, 4 pages.

* cited by examiner

INTERACTIVE INDUSTRIAL MAINTENANCE, TESTING, AND OPERATION PROCEDURES

BACKGROUND

Embodiments relate to industrial identification and, more particularly, to methods of and systems for performing interactive maintenance, clearance, testing, and operation procedures (hereafter "MCTO procedures") in an industrial facility, in which components of the facility have been systematically identified and labeled.

Checklists (whether paper or electronic) and similar text-only approaches are commonly used to assist operators and technicians in carrying out MCTO procedures for industrial facilities. In many cases, industrial facilities (for example, factories, oil refineries, and similar facilities) include various piping, valves, equipment, and other components (sometimes referred to herein as "assets") spread over a large area (for example, five or more acres). Identifying labels and instrumentation diagrams are relied upon to find and control the various assets of the facility. Items on checklists are marked or "checked off" when various procedures are performed.

SUMMARY

Current approaches to carrying out MCTO procedures suffer from a number of deficiencies. Current approaches heavily rely on human capabilities and are subject to human frailties and errors. They do not to prevent an operator or technician from failing to perform a procedure fully or correctly or from performing the procedure with the wrong asset. They do not include photographs that are correlated to a point-cloud or other mapping of the facility in an interactive procedure. Some embodiments are directed to preventing or reducing errors of operators performing MCTO procedures due to misreading identification labels, and thus incorrectly determining a location or equipment at or on which a procedure is to be performed. Some embodiments are directed to preventing or reducing errors in performing MCTO procedures such as by missing or skipping a procedural step or otherwise performing an MCTO procedure incorrectly.

Other embodiments are directed to preventing or reducing errors of operators performing procedures due to misreading identification codes.

One embodiment provides a method of performing an interactive procedure with a portable smart device utilizing assets that include asset identifiers in an industrial facility. The method includes providing indicia and photographs on a display of the portable smart device for procedural steps of a procedure to be performed on the industrial facility. Upon the portable smart device receiving an input to begin the procedure, the method displays on the portable smart device a first procedural step for a location of a first asset having a first asset identifier, and a photograph that includes the first asset. Upon the portable smart device receiving an input to provide a scan, the method scans for the first asset identifier of the first asset, reads the scanned asset identifier and determines whether the scanned asset identifier matches the first asset identifier. Upon the method matching the scanned asset identifier and the first asset identifier, the method displays a second procedural step on the portable smart device for an action by the first asset and displays a request to confirm that the second procedural step for the first asset is completed. Upon the portable smart device receiving an input that confirms execution of the second procedural step, the method includes providing indicia and a photograph on the display of the portable smart device for a third procedural step to be performed.

Another embodiment provides a portable smart device for performing an interactive procedure utilizing assets that include asset identifiers in an industrial facility. The portable smart device includes a processor having a memory device; a camera for scanning images and for obtaining photographs; and a display including a touch screen for indicia and/or photographs of procedural steps of a procedure to be performed on an industrial facility. The processor is configured to, upon the portable smart device receiving an input to begin the procedure, displaying on the portable smart device a first procedural step for a location of a first asset having a first asset identifier, and a photograph that includes the first asset. The processor is also configured to, upon the portable smart device receiving an input to provide a scan, scanning for the first asset identifier of the first asset, reading the scanned asset identifier and determining whether the scanned asset identifier matches the first asset identifier. The processor is configured to, upon the scanned asset identifier matching the first asset identifier, displaying a second procedural step on the portable smart device for an action by the first asset and displaying a request to confirm that the second procedural step for the first asset is completed by the portable smart device. Finally, upon the portable smart device receiving an input that confirms completion of the second procedural step, the processor is configured to provide indicia and/or a photograph on the display of the portable smart device for a third procedural step to be performed.

Other aspects of the various embodiments will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
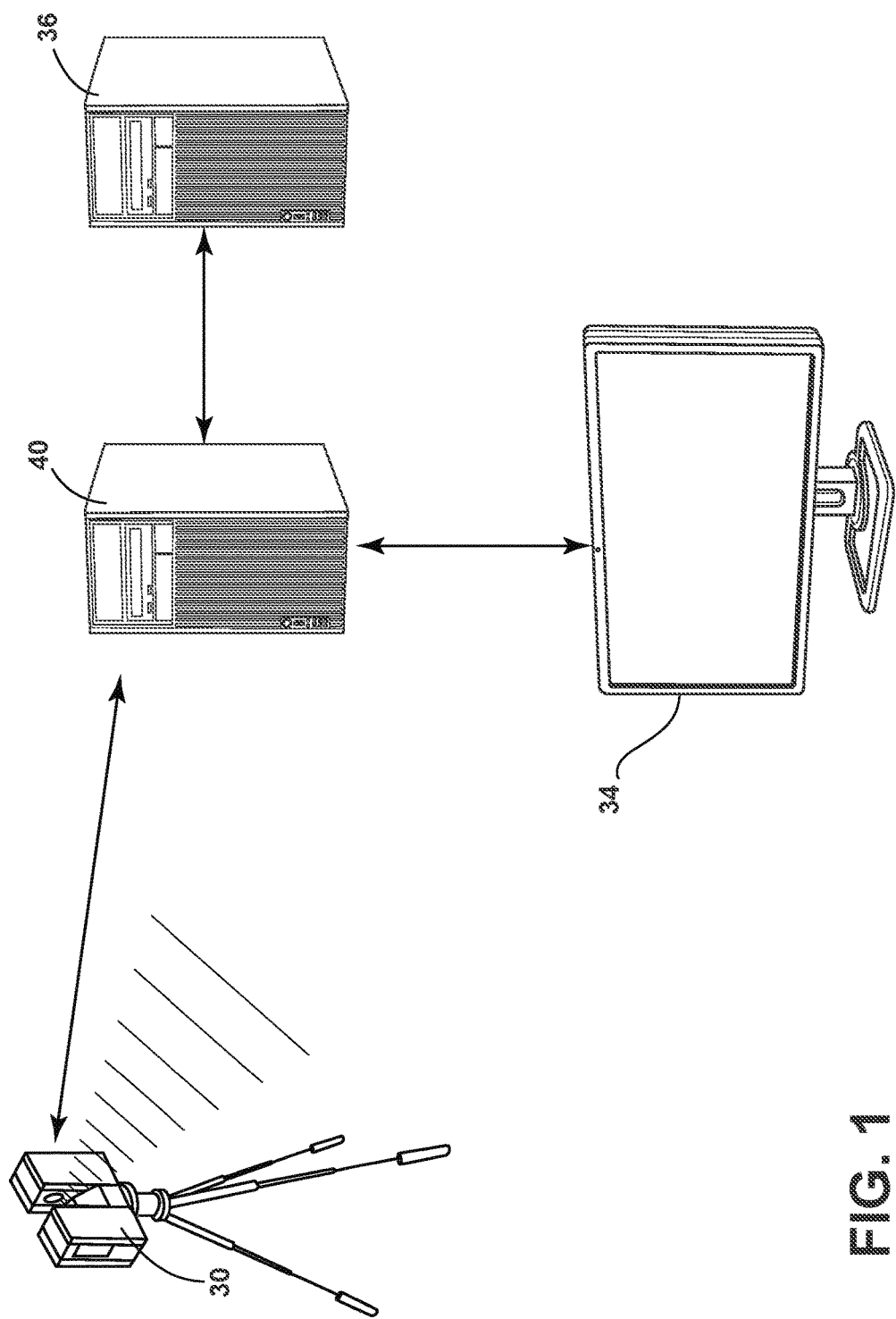
FIG. 1 shows a diagram of a system for obtaining a piping and instrumentation diagram of an industrial facility.

FIG. 1 shows a three dimensional (3-D) laser scanner 30 for laser scanning of piping and other equipment in an industrial facility to obtain a piping and instrumentation (P&ID) diagram. The laser scanner 30 is a known device, such as a light detection and ranging device (LiDAR) that uses one or more lasers and cameras to measure and capture environments in three dimensions (3-D). The laser scanner 30 projects a laser beam and for every surface that the laser beam hits, a point in space is recorded (xyz). At the same time, the laser scanner 30 will also record the reflectivity of the surface giving an intensity value, and may include cameras which sense color and thus provide a red/green/blue (RGB) color value to each point. These points are captured at speeds of up to at least 1 million points of data per second, creating a very dense point cloud of data. The scanning is performed at different locations and in different directions that are stored. Accordingly, besides the point cloud, the location and orientation of the laser scanner 30 is provided.

FIG. 1 also shows an administrative user interface 34 and a memory database 36 in communication with a local computer 40. In one embodiment, the memory database 36 includes terabytes of data. In other embodiments, greater amounts of data storage, are contemplated for mapping or otherwise obtaining a piping and instrumentation (P&ID) diagram for an industrial facility having a piping installation with piping and equipment.

Creating a Piping and Instrumentation Diagram

Figure 2:
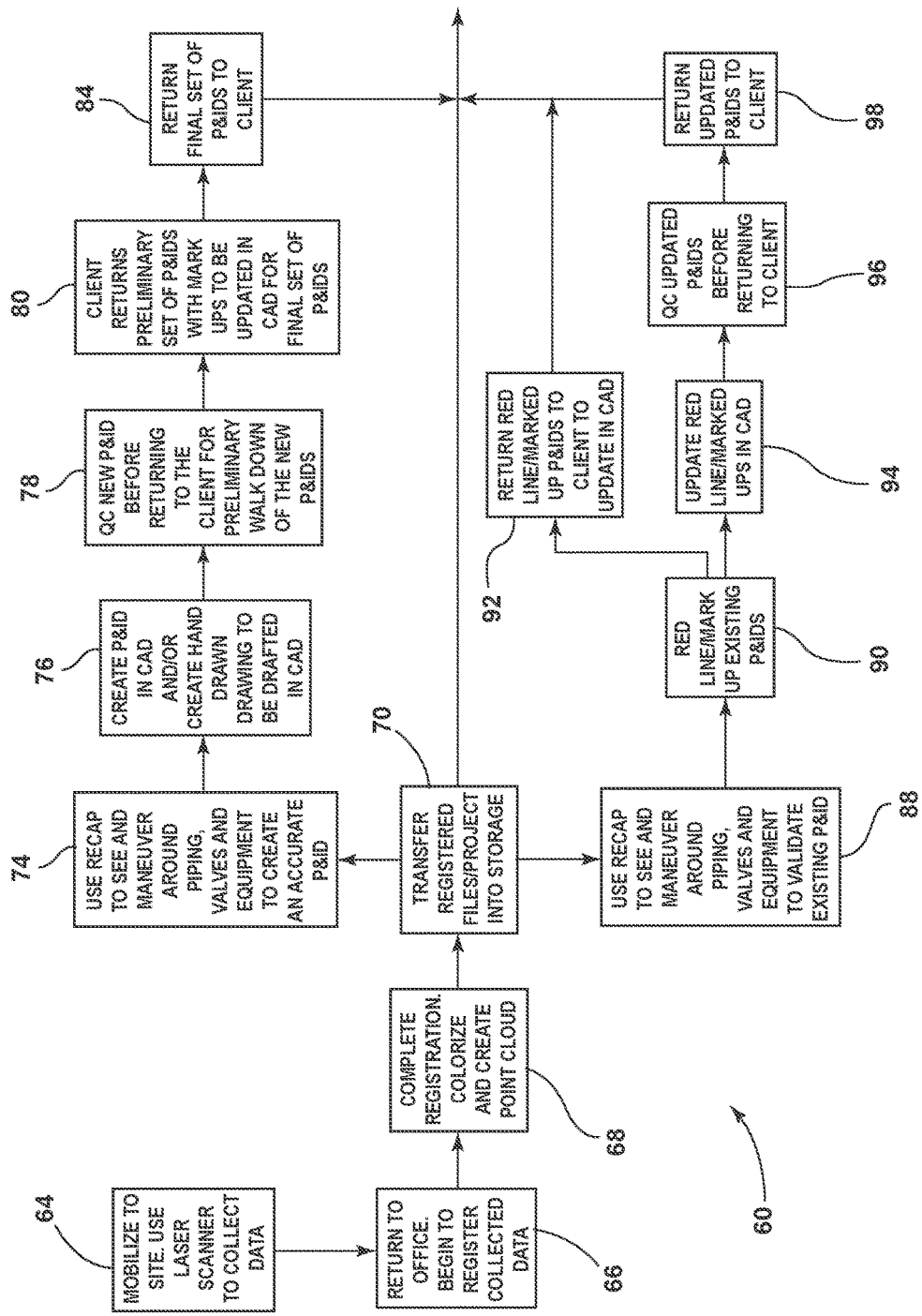
FIG. 2 is a flow chart for creating a piping and instrumentation diagram.

FIG. 2 shows a flow chart illustrating an exemplary method 60 of creating a P&ID diagram for an industrial facility. Although illustrated in sequential order, except for parallel branches, the various steps of the flow chart 60 may be performed sequentially, simultaneously, or in a different sequence. Further, the parallel branches represent different approaches to obtaining P&ID diagrams.

The method 60 includes mobilizing the laser scanner 30 having a camera to collect and store laser data including images corresponding to different locations within an industrial facility (step 64). Thereafter, in one embodiment an operator returns to their office or work space and loads the images from the laser scanner 30 into the memory database 36 via the local computer 40. The computer 40 registers the images from laser scanning (step 66) to create a point cloud. More specifically, upon complete registration of the images, including the locations and the orientation of the images obtained from the laser scanner 30, the local computer 40 creates a point cloud (step 68) that is stored in the memory database 36. Registering is performed by using either targets in the scans, known survey points, or by allowing enough overlap in the scans to register by recognizing common features (cloud to cloud). Thus, a program executed by the local computer 40 performs the registering, the colorizing, and the creating of the point cloud.

In one embodiment, an operator utilizes the stored point cloud data to see and maneuver about piping valves and equipment to create or obtain an accurate P&ID (step 74). Subsequently, the user creates a P&ID in a computer aided design (CAD) program and/or creates by hand a drawing to be drafted in CAD (step 76). Subsequently, quality control (QC) of the new P&ID is performed before providing drawings to a client for a preliminary walk down of the newly created P&ID diagram (step 78). In one embodiment, a client (for example, an owner of an industrial facility) returns preliminary mark ups of the P&ID diagram to be updated as a final accurate P&ID diagram (step 80). Thereafter, a final set of P&ID diagrams are prepared and provided to a client (step 84).

In another arrangement, a user uses the registered data images to maneuver around piping, valves, and equipment to validate the existing P&ID diagram created by the registered files from the laser scanned images (step 88). Subsequently, red line mark ups are provided for the existing P&ID diagram as needed (step 90).

Thereafter, two alternatives are presented in FIG. 2 advancing from step 90. In a first approach, the drawing mark ups are provided to a client to update in CAD (step 92). As a second alternative, the red lines and marks ups are updated in CAD (step 94) and quality control (QC) of the updated P&ID is performed (step 96) before providing the P&ID diagram to the client (step 98).

Another alternative arrangement shown in FIG. 2 includes advancing directly from step 70 without further steps. In this embodiment, the registration of the laser data is such that the registered information to create the P&ID diagram is completed without any adjustments or validation steps.

Regardless of the particular embodiment implemented, captured 3-D laser data and/or color images, such as photographs, are registered and colorized and a point cloud is created. In one embodiment, the 3-D data is processed at least in part, by reality capture (ReCap) scanning software to create the P&ID diagram. The P&ID diagram is validated at the site or otherwise obtained as set forth above.

Identification and Labeling of Equipment

Figure 3:
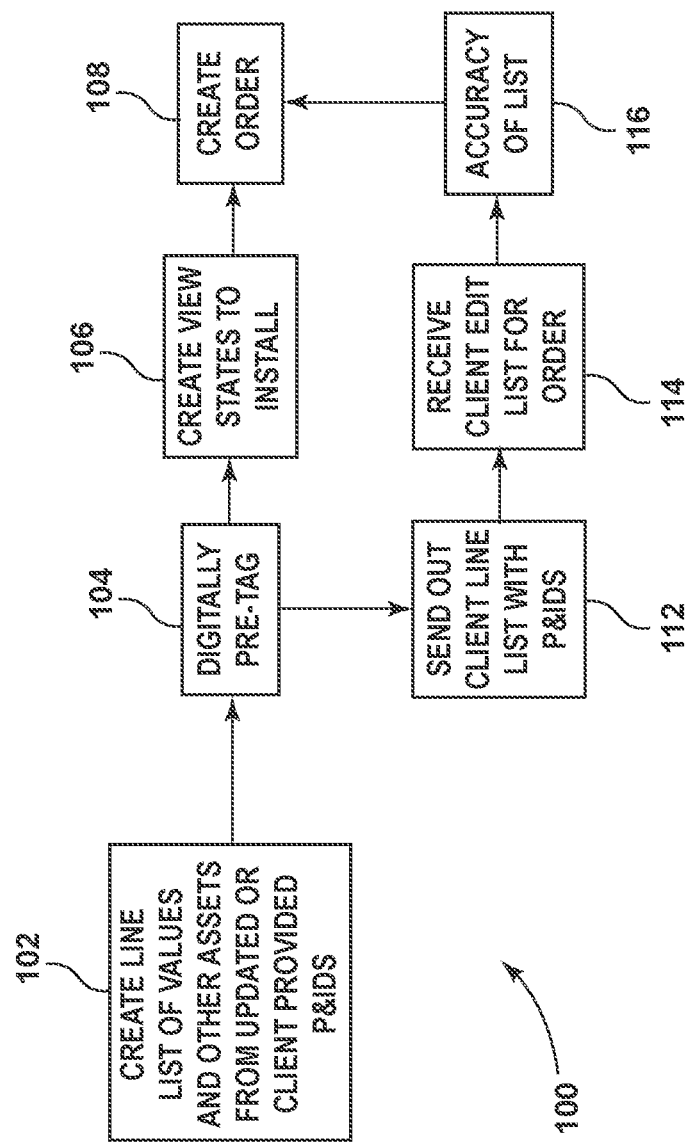
FIG. 3 a flow chart for creating instructions for installing markers and tags.

FIG. 3 shows a flowchart of an algorithm or other program 100 that is executable by the local computer 40 to provide unique identification (for example, using labels or quick response (QR) codes) of specific assets, such as valves and other equipment for the validated P&ID diagram. First, a line list of assets is created, obtained, or updated (step 102) from client provided P&ID diagrams describing various assets thereof. Thereafter, the list is digitally pre-tagged (step 104). Then, the assets shown in the validated P&ID diagram are labeled based on the line list. Then, windows that include indicia and/or photographs, along with other information, is provided for view states for installing tags on the assets of the validated P&ID diagram (step 106). Indicia include icons, menus, scroll bars, buttons pull-down menus, wizards, buttons, selectors, photographs, video and text. An order or sequence for mounting of the labels and the tags is determined (step 108) and stored in the memory 36. Alternatively or additionally, the digitally pre-tagged information (attained at step 104) is sent (step 112) to a client that receives the client line list with the P&ID diagram (step 114). The client checks the P&ID diagram having labeled assets for accuracy (step 116). Assuming the P&ID diagram and listed assets are accurate and/or inaccuracies are corrected, the program advances and an order or sequence for mounting of the tags or labels for the assets is determined (step 108). In creating an order, a specific sequence for providing specific tags and labels to the assets is determined. In one embodiment, the sequence includes pictures of the asset to be tagged. The labeling information is stored in the memory database 36 by the computer 40.

Meanwhile, unique labels, stickers, tags with QR codes or bar codes, radio frequency identification (RFID) tags and other physical identifiers are prepared for the various assets disposed at various locations in the industrial facility to provide warnings and information to a user. More specifically, warning and informational labels are created for the piping, valves, and other assets and for mounting at locations corresponding to the locations of those assets in the industrial facility.

Figure 4:
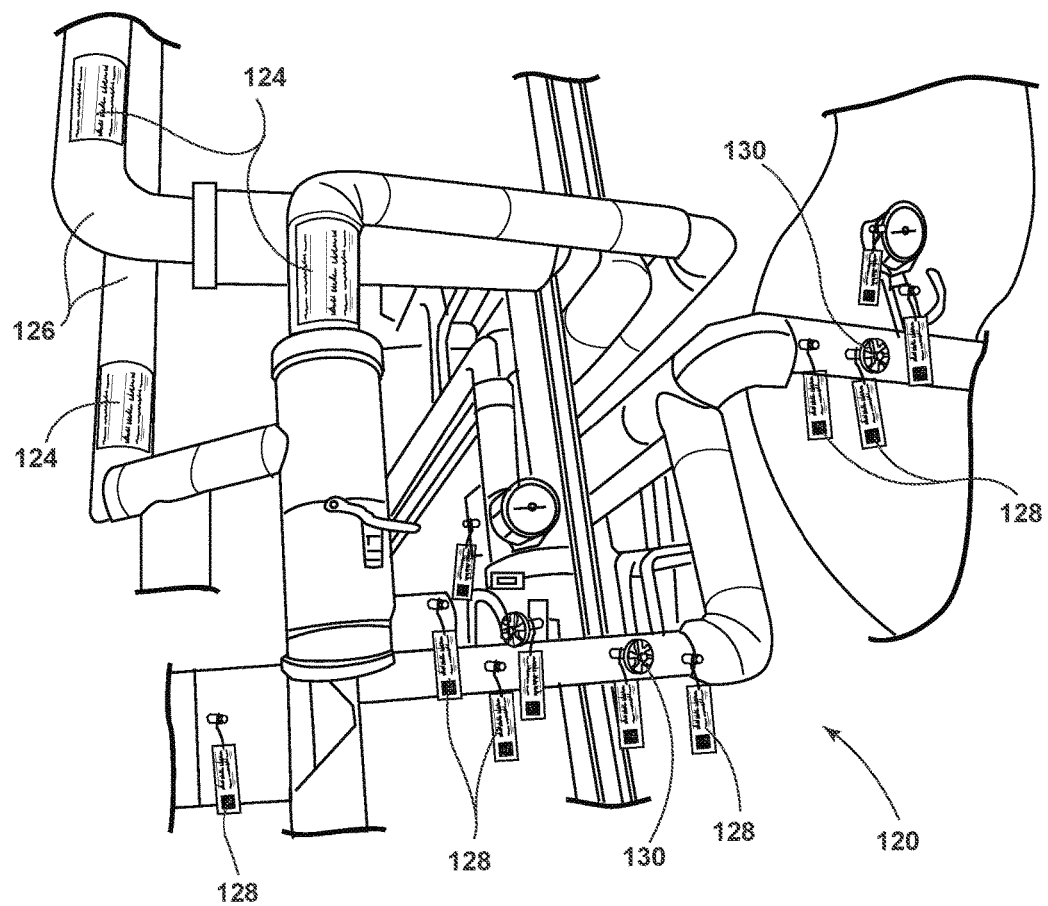
FIG. 4 is a perspective view of piping and instrumentation for a portion of an industrial facility.
Figure 5:
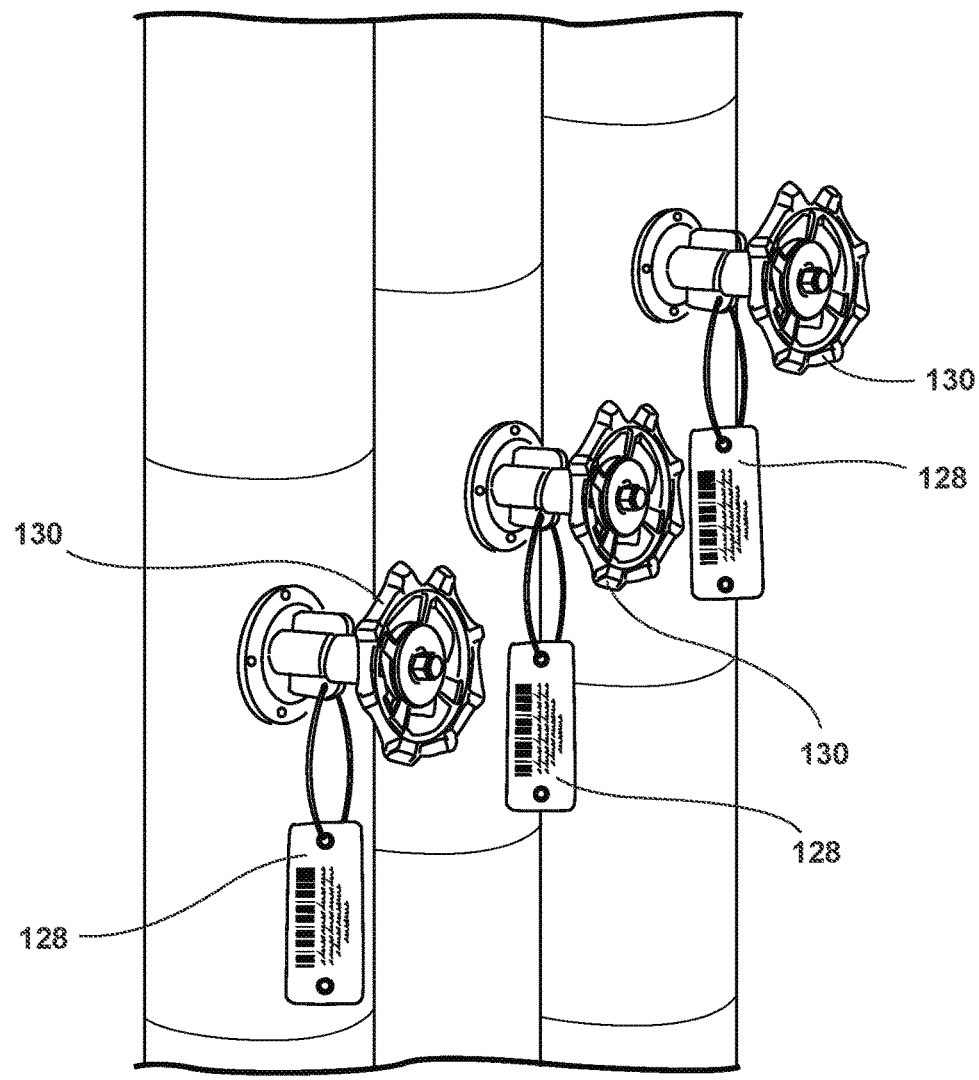
FIG. 5 is a perspective view of valves provided in an industrial facility.

FIG. 4 shows piping and instrumentation for a portion of an industrial facility 120 having a piping installation. The piping includes labels 124 secured to pipes 126 thereof. Further, tags 128 are secured to valves 130 or other assets. FIG. 5 also shows valves 130 of an industrial facility having tags 128 secured thereto. The tags 128 include a bar code for identification thereof. In other embodiments, a unique QR code is provided for the tags and labels.

Asset Information Management Platform

Figure 6:
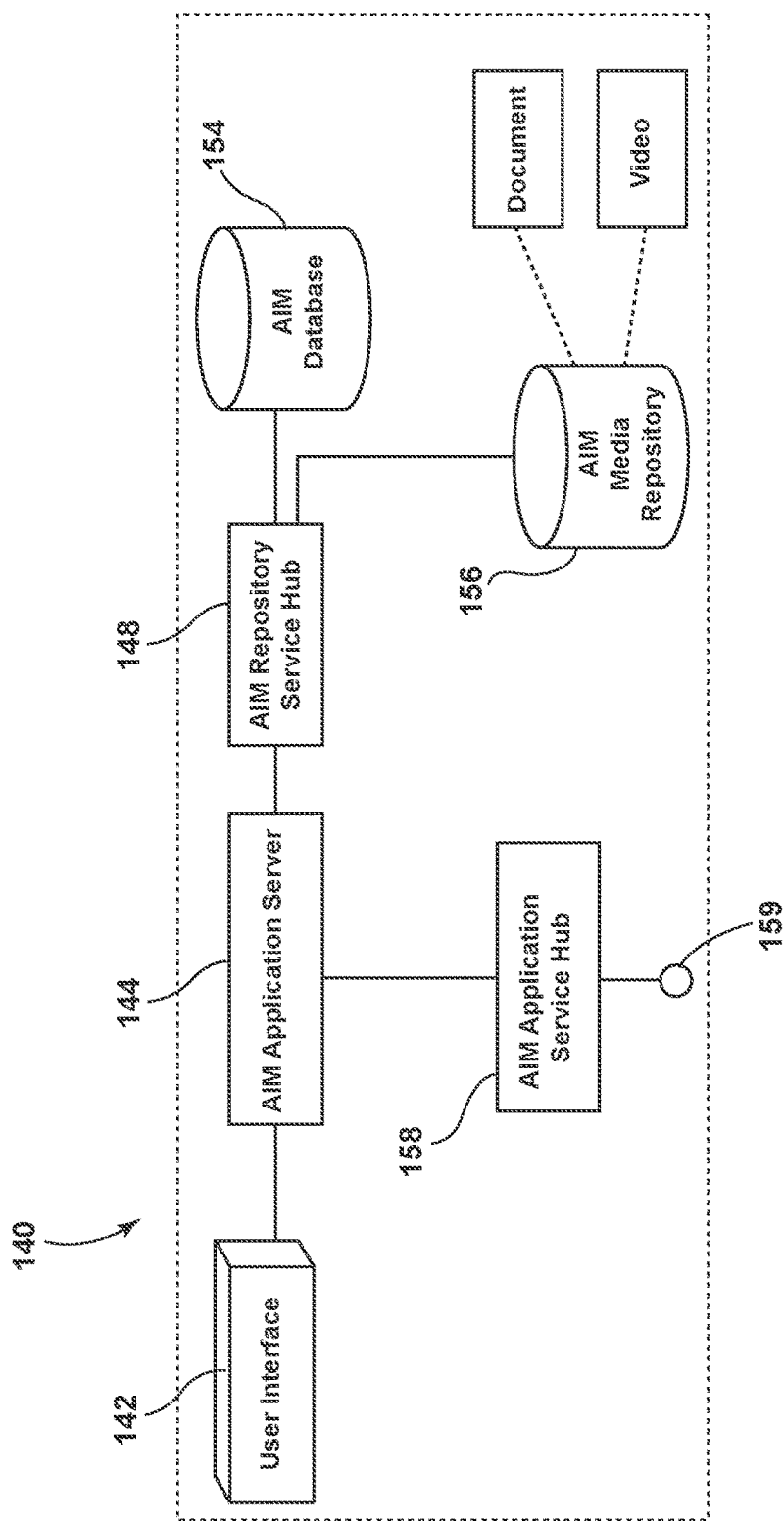
FIG. 6 is architecture diagram of an asset information management application platform.

The asset information management (AIM) application platform 140 shown in FIG. 6 includes an AIM user interface 142 and an AIM application server 144. The AIM application platform 140 includes an AIM repository service hub 148. The AIM repository service hub 148 shown in FIG. 6 links the AIM application server 144 to each of an AIM database 154 and an AIM media repository 156. An AIM application service hub 158 shown in FIG. 6 connects to the AIM application server 144 and includes an asset data provider 159 for two-way communication with other devices. The AIM application service hub 158 also enables synchronization with other devices.

The AIM application server 144 hosts a graphical user interface containing multiple pages. The AIM user interface 142 allows an administrator to control the settings of the AIM application server 144 and to receive associated asset media for specified facilities for storage by the AIM application platform 140. In one embodiment, the AIM application platform 140 is a cloud based arrangement. In another embodiment, the AIM application platform 140 is an application platform used to capture and manage all asset related information for multiple purposes including MCTOs, training, reference, etc.

The AIM media repository 156 securely manages video, photographs, images, and document content. The AIM media repository 156 is also scalable based on the needs of the AIM application platform 140.

Figure 7:
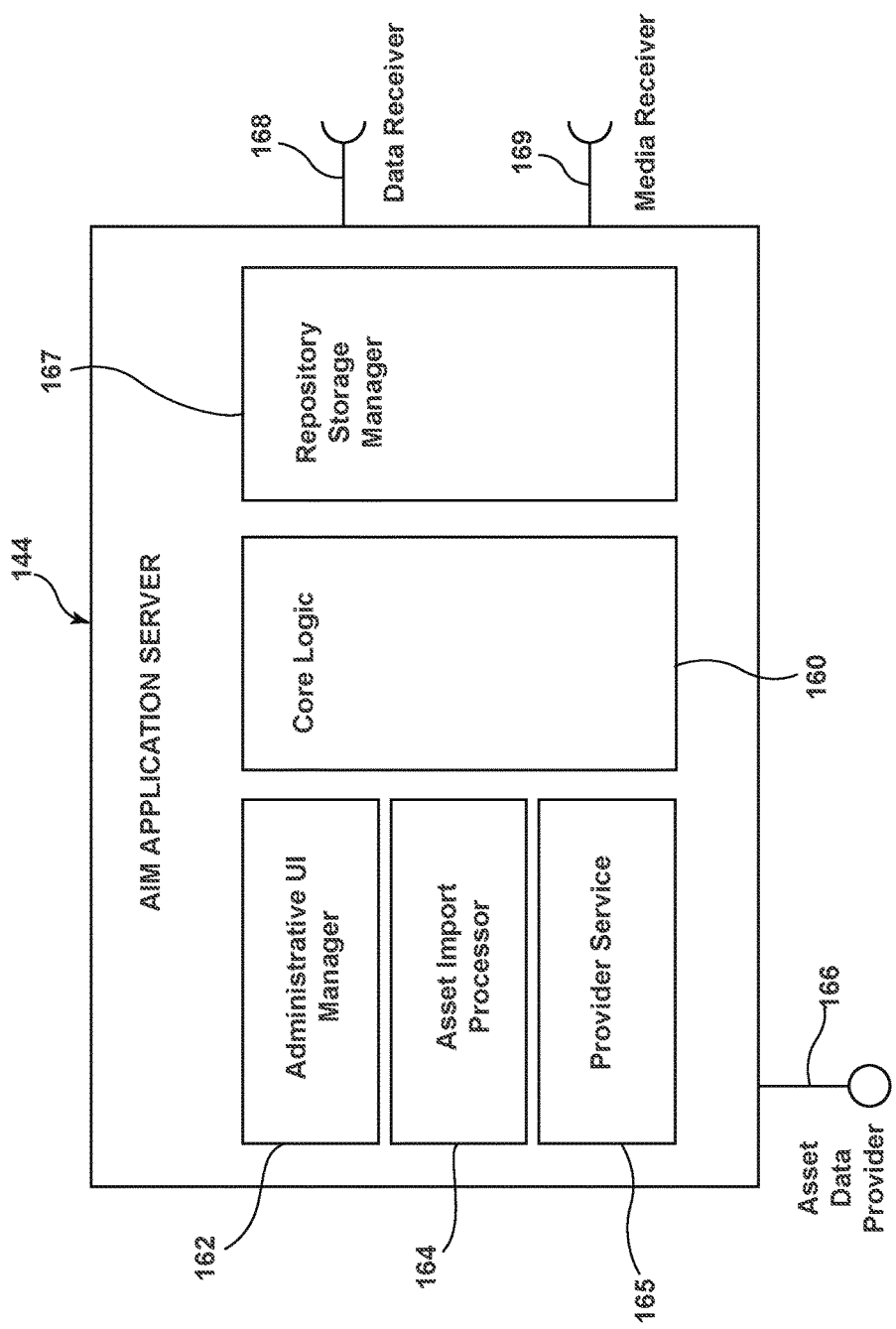
FIG. 7 is a block diagram of the asset information management application server shown in FIG. 6.

FIG. 7 is a block diagram of the AIM application server 144 shown in FIG. 6. The AIM application server 144 includes core logic 160 for performing processing operations and an administrative user interface (UI) manager 162 for communicating with the user interface 142 shown in FIG. 6. Further, the AIM application server 144 includes an asset import processor 164 for processing asset information provided thereto. The AIM application server 144 includes a provider service 165 for communicating with the AIM application service hub 158 shown in FIG. 6 via an asset data provider 166. Finally, the AIM application server 144 includes a repository storage manager 167 for communicating with the AIM database 154 via the data receiver 168 and the repository service hub 148. Further, the repository storage manager 167 communicates with the AIM media repository 156 via the media receiver 169 and the repository service hub 148.

While shown as blocks in FIG. 7, in some embodiments the core logic 160, the AIM administrative UI manager 162, the asset import processor 164, the provider service 165, and the repository storage manager 167 are programs executable by a processor of the AIM application server 144. The data receiver 168 and the media receiver 169 enable both two-way communication and two-way data transmission with the respective AIM database 154 and the AIM media repository 156.

Client Application Interactive Procedure System

Figure 8:
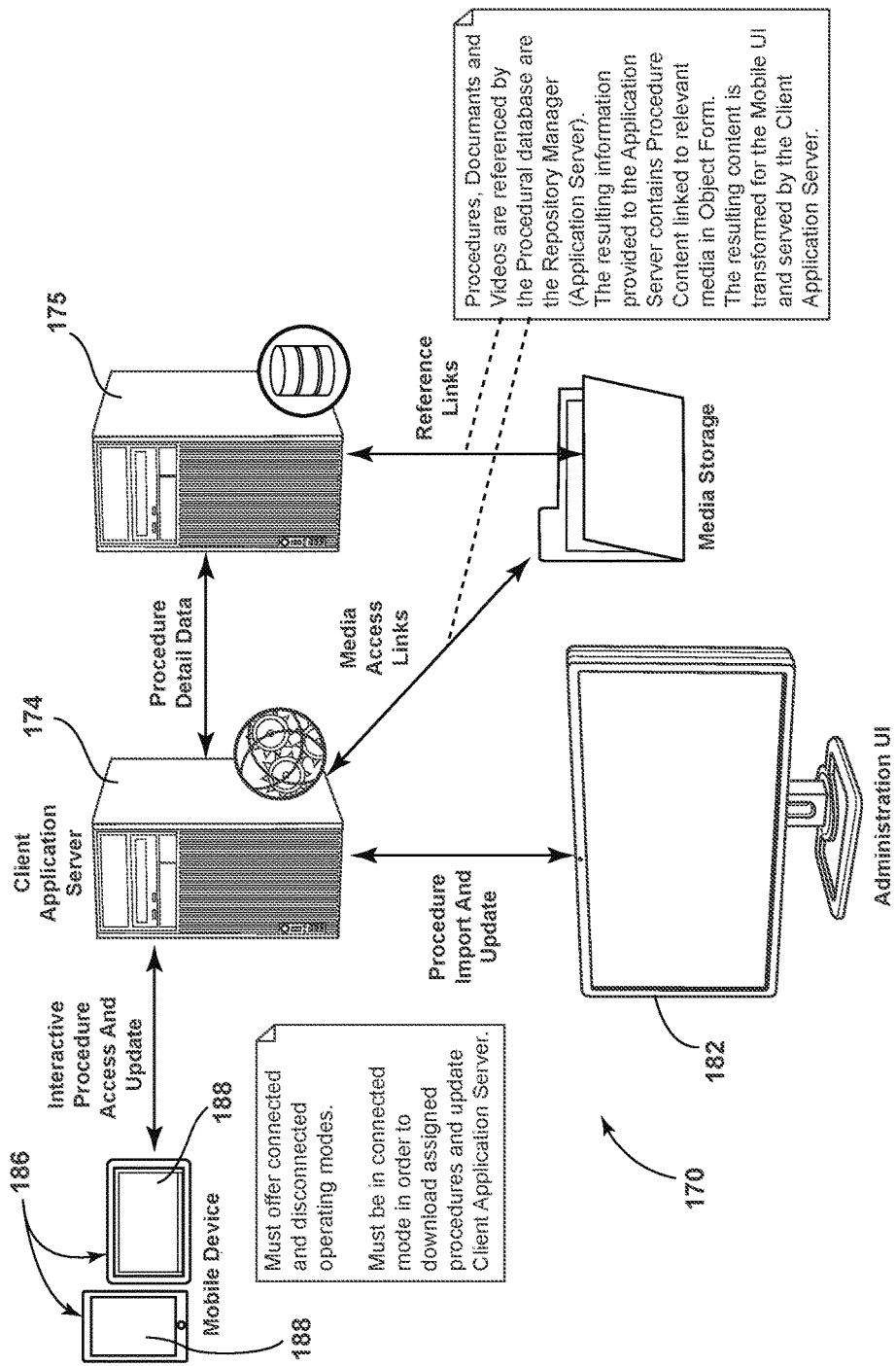
FIG. 8 is a client application interactive procedure system.
Figure 9:
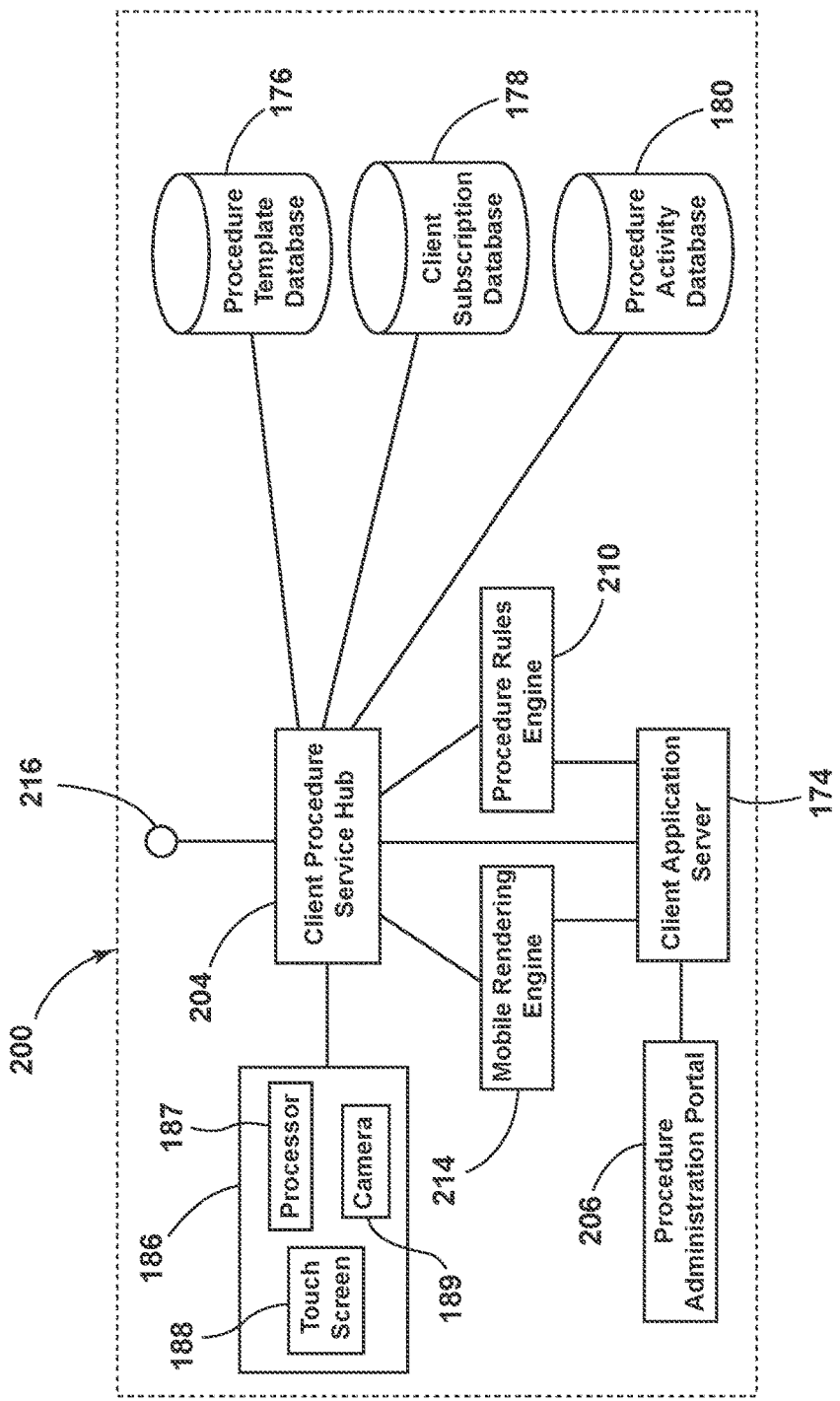
FIG. 9 is an architecture diagram of the client application interactive procedure system of FIG. 8.

FIG. 8 shows a client application interactive procedure system 170 that includes a client application server 174. A server 175 or other memory device provides databases as shown in FIG. 9 including media storage. FIG. 8 shows a client administration user interface 182 and a client portable smart device 186 having a display and a camera (not shown). The server 175, the administration user interface 182 and the mobile smart device 186 are all provided in communication with the client application server 174. In one embodiment, each portable smart device 186 is a tablet computer having a processor 187 (FIG. 9), a touch screen 188, and a camera 189 (FIG. 9) capable of scanning images and obtaining photographs. The camera 189 includes an auto-focus for automatically focusing on an image when a photograph is obtained. In one embodiment, the portable smart device 186 includes a radio frequency identification (RFID) reader.

FIG. 9 is an architecture diagram 200 of the client application interactive procedure system 170 shown in FIG. 8. The architecture diagram 200 illustrates a client procedure service hub 204 that connects the client application server 174 to a procedure template database 176, a client subscription database 178, a procedure activity database 180, and the portable smart device 186. The portable smart device 186 includes the processor 187, the touch screen 188 that provides a display thereon, and the camera 189. The camera 189 typically is a digital camera that as capable of optical scanning and video recording. The architecture diagram 200 illustrates a procedure administration portal 206 in communication with the client application server 174. In one example, the procedure administration portal 206 is a secure web-based application that permits the input of client or MCTO procedures. All client information, including asset subscription data, is maintained in the client subscription database 178, which adds control and scalability to the client application interactive procedure system.

FIG. 9 also shows a procedure rules engine 210 that is used via the procedure administration portal 206 to set up the operating conditions and participating assets of the procedure before the information is provided to the mobile rendering engine 214. The mobile rendering engine 214 packages a procedure into an executable script-like package. The procedure is downloaded to a portable smart device 186 connected to the client application server 174 via the client procedure service hub 204. FIG. 9 also shows a client asset data provider 216 for receiving asset data from, for example, an AIM application platform 140 that, in one embodiment, acts as a cloud server.

Figure 10:
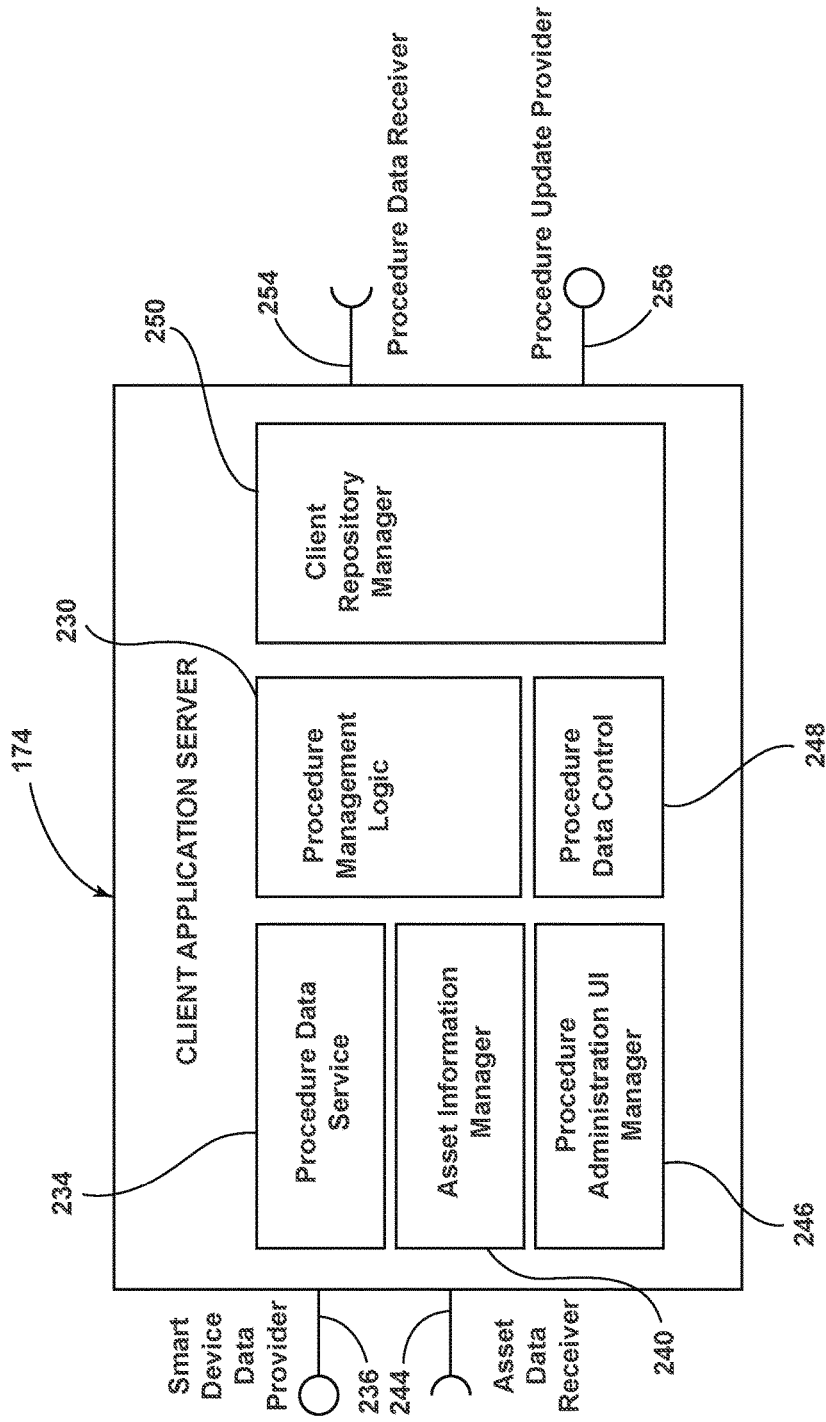
FIG. 10 is a block diagram of the client application server shown in FIGS. 8 and 9.

FIG. 10 is a block diagram of the client application server 174 shown in FIG. 8. The client application server 174 includes procedure management logic 230 for processing or executing various programs or algorithms. Further, the client application server 174 includes a procedure data service 234 for procedures and a smart device data provider 236 for connection to and communication with a portable smart device 186. Further, the client application server 174 includes an asset information manager 240 and an asset data receiver 244 to process and receive asset information. Further, the client application server 174 includes a procedure data control 248 and a client repository manager 250. The client application server 174 includes a procedure data receiver 254 and a procedure update provider 256. The client application server 174 provides various information for a procedure, including indicia and/or photographs, to the portable smart device 186.

Transfer of Asset Information

In a first operation, in one embodiment the computer 40 transmits validated P&ID diagrams or labeling instructions based thereon, and equipment information for assets mapped therein from the memory database 36 to the AIM application platform 140 for storage in the AIM database 154. Further, the interactive procedure for applying the labels 124 and tags 128 to the piping and instrumentation is provided. Thereafter, the client application interactive procedure system 170 operates to obtain labeling instructions and equipment information from the AIM database 154 for storage in the procedure template database 176. Thus, the labeling information, along with the specific asset information, is provided to the client application interactive procedure system 170. Thereafter, a client portable smart device 186 is synchronized or otherwise connected to the client application interactive procedure system 170. Specified asset information and labeling instructions for labelling are received from the procedure template database 176 of the client application interactive procedure system 170 and loaded onto the client portable smart device 186. In some embodiments, the labeling instructions include sub-diagrams based on P&ID diagrams.

Labeling of Facility

The labelling information, along with the specific asset information, is obtained by executing an interactive labeling procedure on the portable smart device 186. Labeling is generated for the equipment, piping, valves, and other assets throughout the facility. The interactive procedure for labeling the piping, valves, and other assets is carried out in a manner similar to the procedures discussed herein below. In one instance, a photograph of a mounting location for a label is shown on the display of the client portable smart device 186 to assist in properly locating the site and the asset to be labeled. Upon applying the label, a program executed by the portable smart device 186 requests a notation and/or a photograph showing that the labeling or marking has been completed. Upon one label or tag being applied and confirmed, the client portable smart device 186 displays on the touch screen 188 a subsequent location and another label or tag for securement to a displayed pipe, valve, or other asset. In one embodiment, the portable smart device 186 includes a global positioning arrangement or unit, for receiving a global positioning signal (GPS) that is used to provide navigation to advance to the subsequent location.

Creating Interactive Procedures for Industrial Facility

Figure 11:
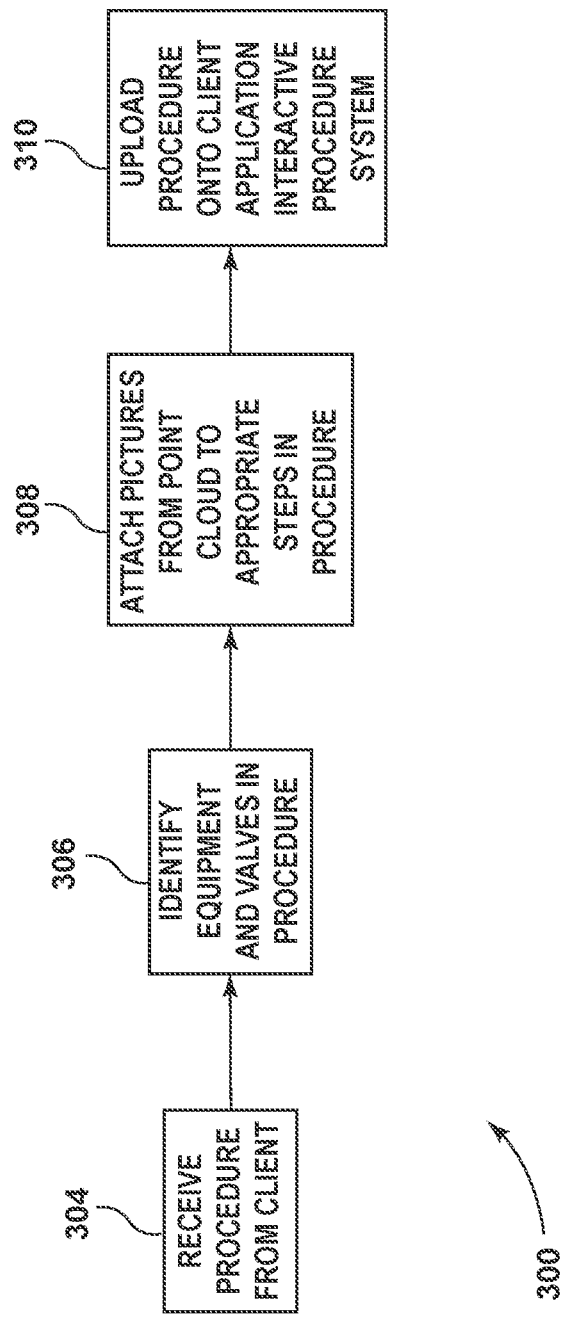
FIG. 11 is a flow chart for a method of creating a procedure.

FIG. 11 shows a flow chart for creating an interactive procedure 300 for an industrial facility. First, a written procedure having multiple steps is received from a client operating an industrial facility (step 304). An asset, such as a valve 130, utilized in a first step of the procedure is identified (step 306). A geographic location, unique identifier and equipment name are obtained for the asset. Pictures of the asset and other information to assist in the step of the procedure involving the asset are provided or linked to the unique identifier and other characteristics of the asset (step 308). The steps 304, 306, 308 are repeated for the various assets utilized in a procedure in the sequence set forth by the client. The interactive procedure is uploaded to the procedure template database 176 of the client application interactive procedure system 170 (step 310). A plurality of procedures are formulated and stored in the procedure template database 176. As noted, MCTO procedures relate to maintenance, clearance, testing, and operation of an industrial facility. The interactive procedures may include lock-out tag-out (LOTO) steps to ensure powering off of a component in an industrial facility.

Executing a Procedure

Figure 12:
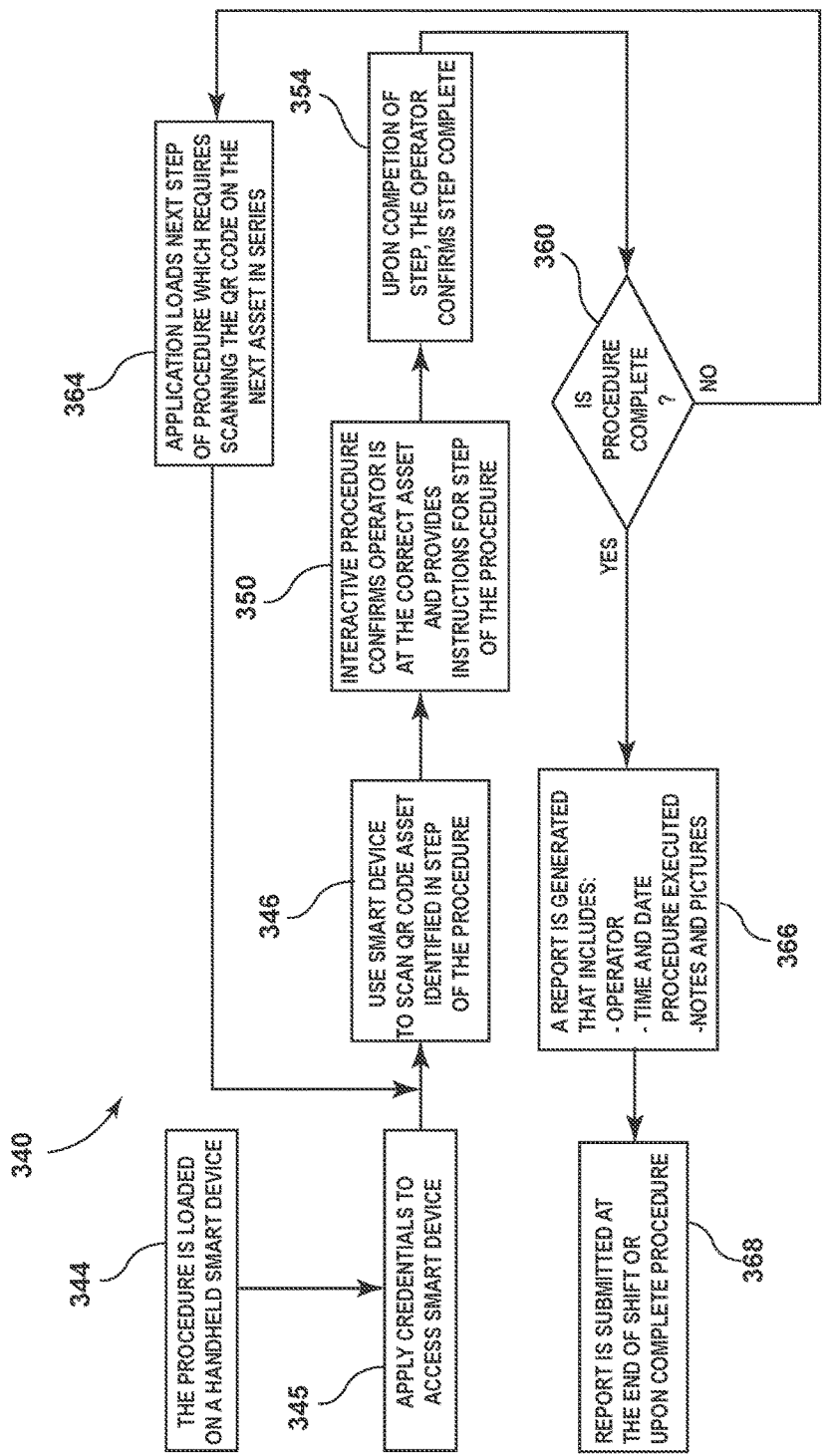
FIG. 12 is a flow chart for executing a procedure.

FIG. 12 shows a flow chart illustrating the execution of an interactive procedure 340. First, interactive procedures are loaded on a portable smart device 186 (step 344) from the client application interactive procedure system 170. In one embodiment, a facility administrator utilizes the client administration user interface 182 shown in FIG. 8, and the client application server 174 to download selected procedures from the procedure template database 176 to the selected portable smart device 186. Instructions for an operator are provided with the portable smart device 186 in some embodiments. Thereafter, the operator provides authentication credentials, such as a password to start and gain access to the portable smart device 186 (step 345).

Then, the operator selects an interactive procedure provided on the portable smart device 186 for execution, if the interactive procedure is not already assigned by the facility administrator. Thereafter, when the operator is located near an asset, he or she actuates a scan function of the portable smart device 186 and scans an asset tag 128 that is displayed in step one of the procedure (step 346). Thus, the portable smart device 186 receives an input to provide a scan, scans for an asset identifier on a tag for an asset, reads the scanned asset identifier and determines whether the scanned asset identifier matches the desired or expected asset identifier.

Thereafter, the interactive procedure visually confirms with the portable smart device 186 that the correct asset tag 128 was selected and provides instructions for a procedure step (step 350). Examples of instructions include to open/close a valve, to push a button, close or open a switch, or the like. Upon completion of the instruction or task, the operator confirms completion of the procedure step with the portable smart device 186 (step 354). In one embodiment, confirming completion includes displaying a picture of the asset acted upon that is obtained by the camera 189 of the portable smart device 186 and stored therein. In some embodiments, the portable smart device 186 is configured to allow an operator to enter notes or comments for each procedural step.

The portable smart device 186 determines if the interactive procedure is complete (that is all the steps in an MTO procedure have been performed and confirmed) (decision step 360). If the procedure is not complete, another asset is displayed on the touch screen 188 for scanning a QR code with the camera 189 of the portable smart device 186 (step 364) and the program returns to step 346. An additional procedural step is repeated (steps 350, 354) and the portable smart device 186 again determines if the interactive procedure is complete (decision step 360).

When the interactive procedure shown in FIG. 12 is complete, the smart device 186 generates a report (step 364) that identifies the operator, time, and date of the procedure, and includes any notes and/or photographs obtained by the operator. Thus, the report documents the execution of the procedure. The portable smart device 186 submits the report at the end of a work shift or upon completion of the procedure (step 368) when the portable smart device is in communication with the client application interactive procedure system 170. The portable smart device 186 communicates or synchronizes with the client application interactive procedure system 170 in a control room or locker room of the industrial facility. The actions completed and information obtained therewith is loaded in the procedure activity database 180.

Examples of Interactive Procedure Steps

Figure 13:
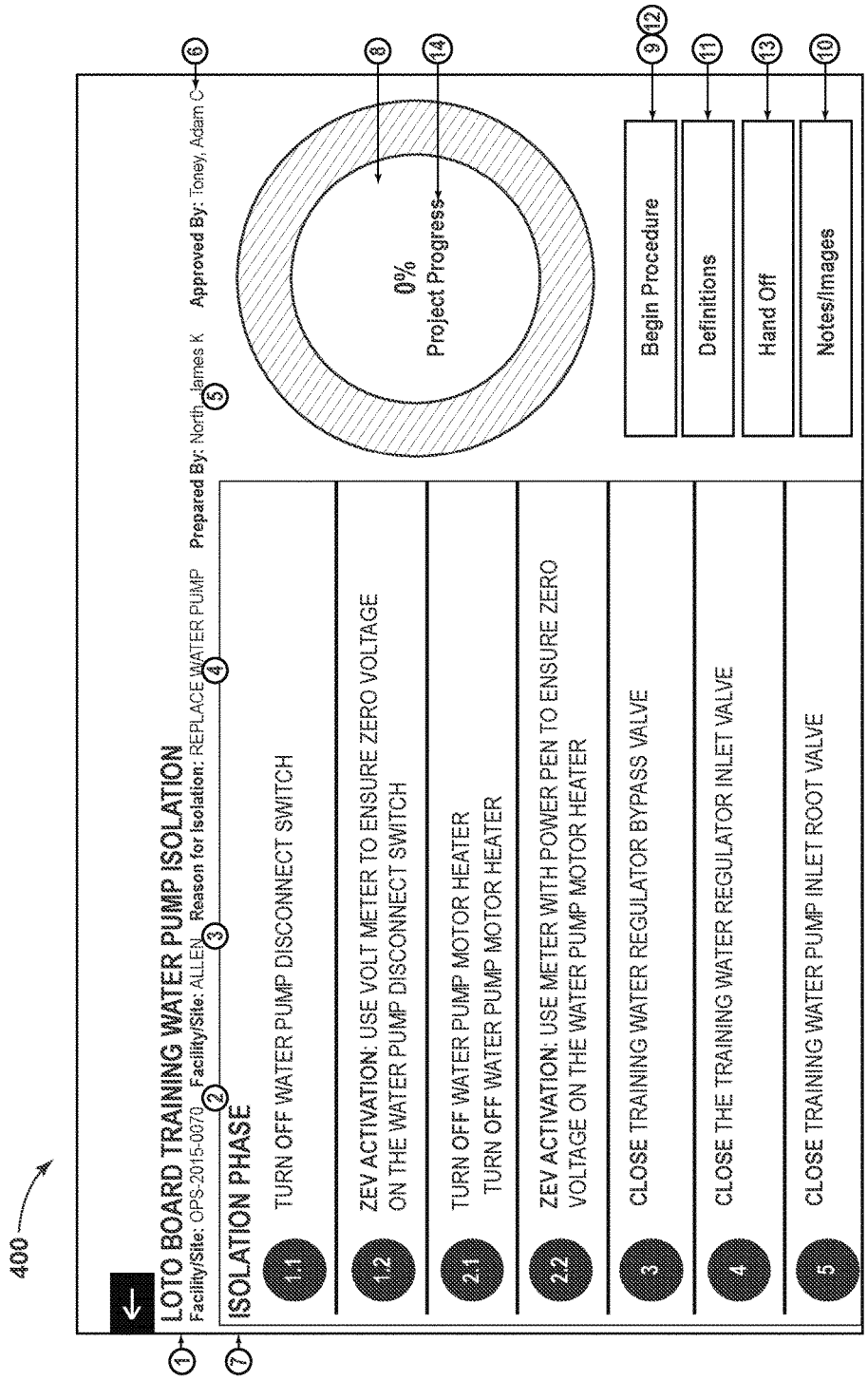
FIG. 13 is an initial graphical user interface display page for a procedure.

FIG. 13 shows an example of an interactive procedure home page or window 400 of a graphical user interface provided on the touch screen 188 of the client portable smart device 186. In the example illustrated in FIG. 13, the interactive procedure is directed to steps for isolating a water pump for replacement thereof. Other examples are possible.

The window 400 includes graphical components including, among other things, a title (in the example shown, "LOTO Board Training Water Pump Isolation"), a facility identifier, a site name, a procedure reason, a procedure author, and a procedure approver. The window 400 also includes procedures steps (shown as encircled numerals 1.1 through 5) for, in the example provided, an "Isolation Phase." The window 400 is architected so that multiple procedure steps, and preferably all of the procedures steps, are displayed to provide an overview of the entire procedure (or the overall procedure) before any individual steps are performed. Thus, a technician or operator is able to review each procedure step in advance. For instance, an operator can note that a "power pen" (for example, a voltage tester or multi-meter) is required in step 2.2, and obtain the power pen before beginning the interactive procedure In the example illustrated, the content components, selection mechanisms, and displays mechanisms in window 400 are labeled as follows:
 1. Procedure Name/Number
 2. Facility/Site: Alphanumeric Identifier
 3. Facility/Site: Name
 4. Purpose:
 5. Prepared By: Name or Initials
 6. Approved By: Name or Initials
 7. Steps of the Procedure in Sequence
 8. Graphical Progress Indicator/Procedure Percentage Complete Scale
 9/12. Begin Procedure Selector (for example, a soft button) to initiate a procedure and confirm roles and responsibilities and provide a signature functionality
 10. Notes/Photographs Selector (for example, a soft button) to cause notes/photographs associated with procedure to be entered or displayed
 11. Definitions Selector (for example, a soft button) to review definitions of procedure terminology
 13. Hand-off Selector (for example, a soft button)
 14. Textual Display Zone for Procedure Progress In the example illustrated in FIG. 13 only a portion of all of the steps of the water pump replacement procedure are shown. Selection of the Begin Procedure selector (9) on the touch screen 188 causes advancement of the interactive procedure whereby only a single procedure step is displayed in the window 400. The procedure steps are displayed individually until confirmed to ensure that a procedural step is not skipped during the interactive procedure. Thus, the window of the graphical user interface during an interactive procedure does not provide an indication of a subsequent procedural step.

In executing the interactive procedure illustrated in FIG. 13, step 2.2 of ensuring zero voltage on the water pump motor heater can require capturing a photograph showing a zero reading on the power pen. Capturing of photographs showing the valves 130 in a closed position are also required for procedural steps 3-5. Thus, the interactive procedural method set forth in the window 400 requires that procedural steps or tasks are performed and confirmed before advancing to another procedural step.

Figure 17:
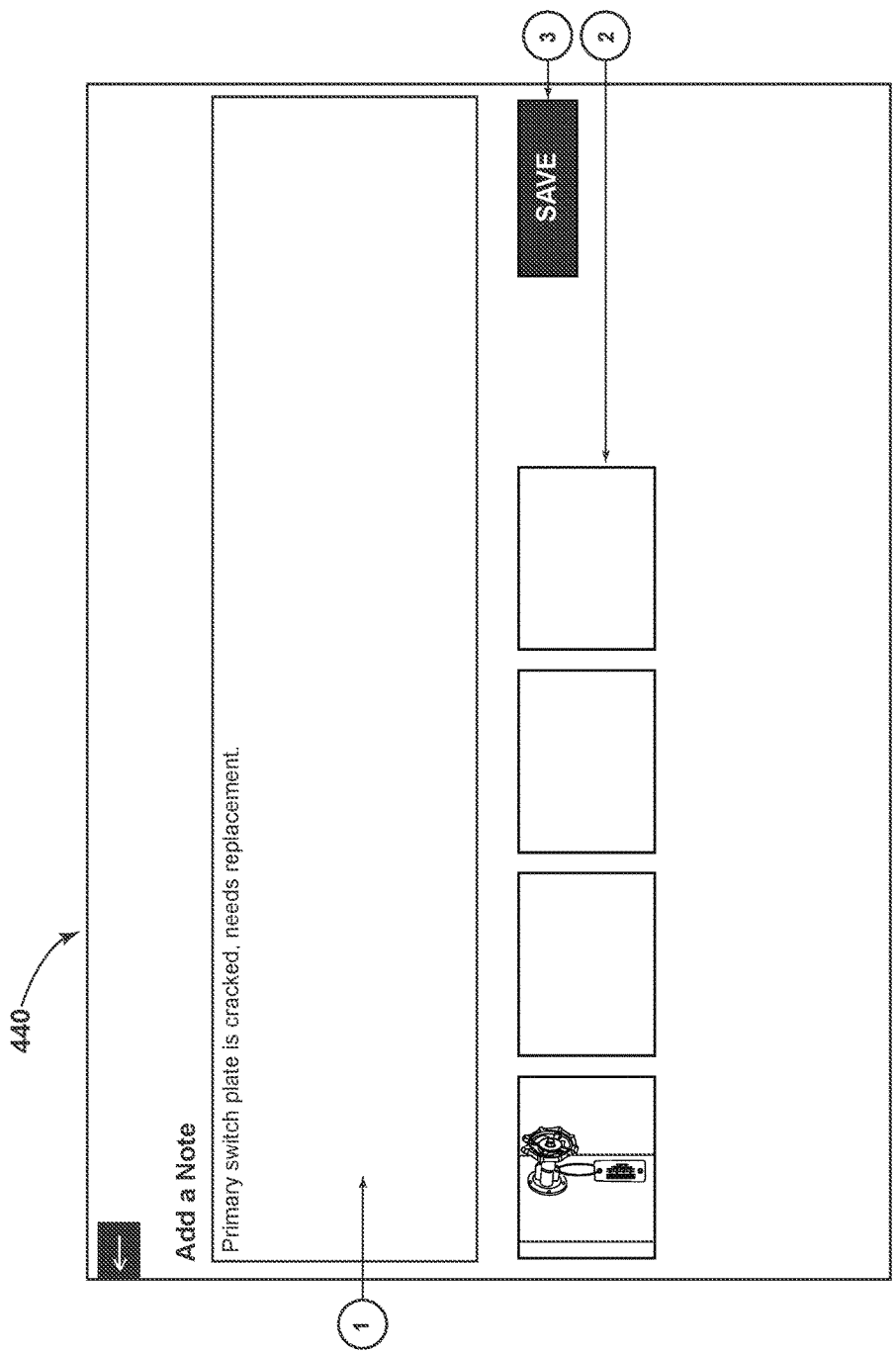
FIG. 17 is window of an equipment log note page graphical user interface for use with the procedure of FIGS. 14-16.
Figure 18:
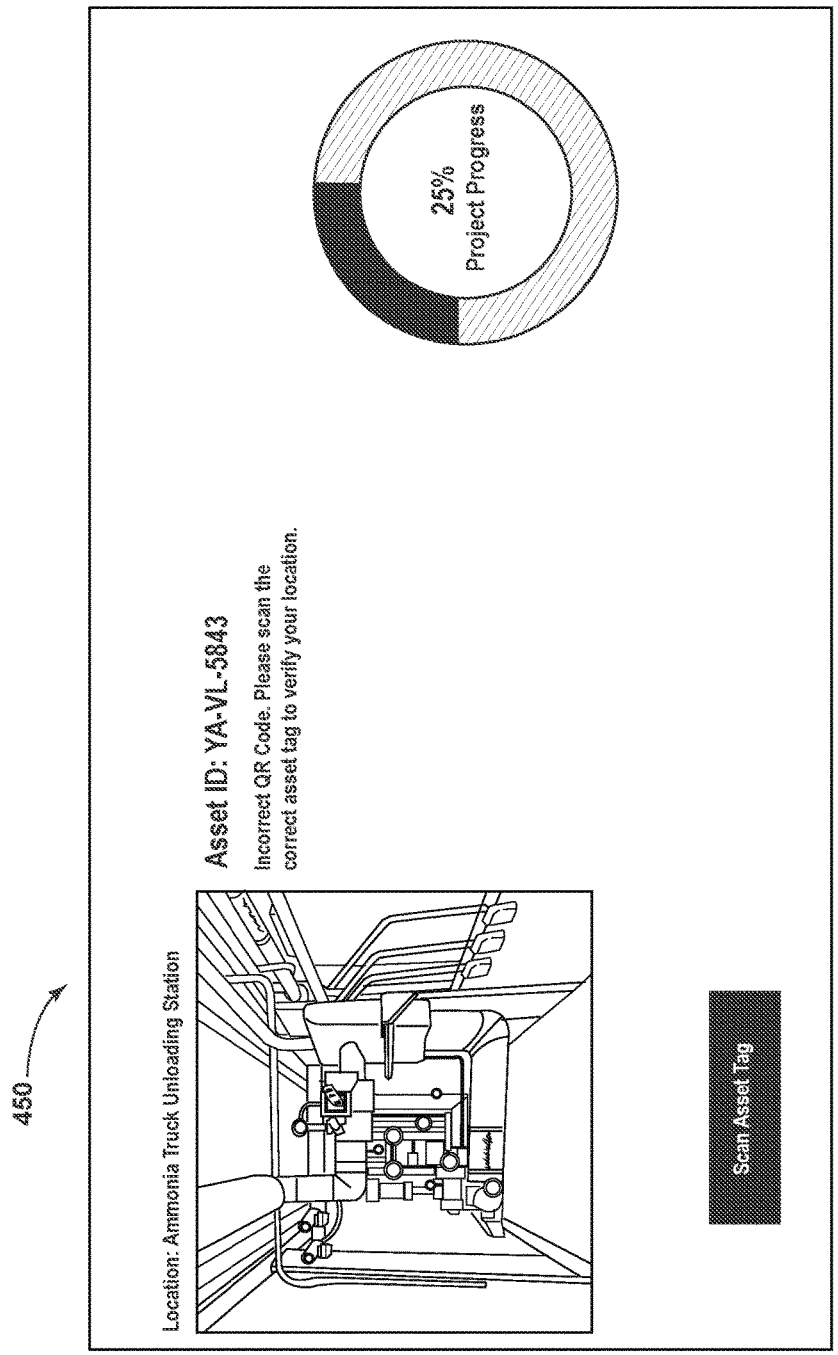
FIG. 18 is a window of a graphical user interface of a procedural step for the procedure of FIGS. 14-16 when the wrong asset tag is scanned.

Actuating the selector (10) on the touch screen 188 allows an operator to advance to a page, dialog box, or window for adding notes and photographs as explained in greater detail below and as shown in FIG. 17. Actuating the selector (11) provides definitions of terminology. Actuating selector (13) provides a hand-off function to initialize the portable smart device 186 with a different user or operator.

Figure 14:
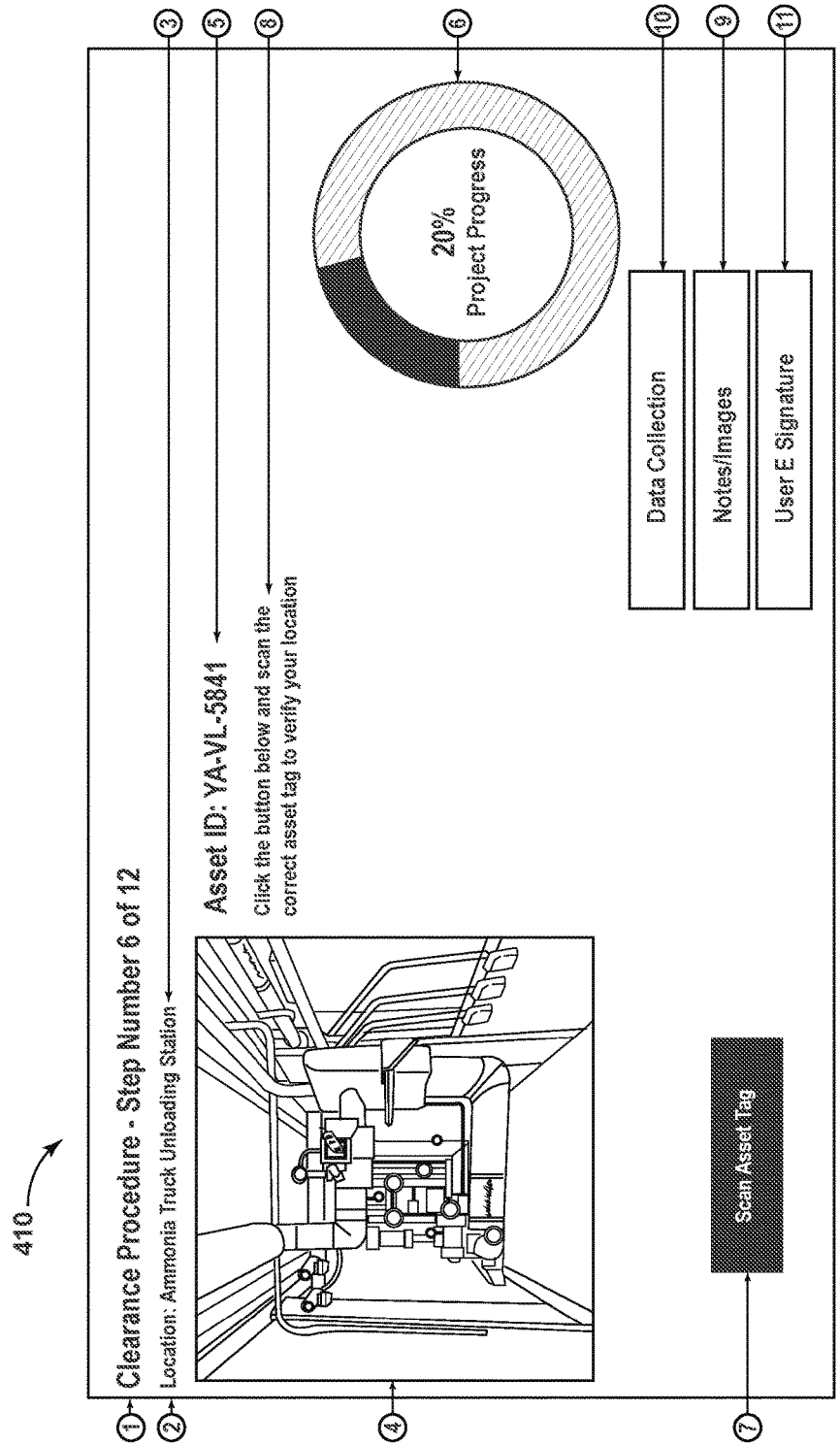
FIG. 14 is a window of a graphical user interface of a procedural step for a different procedure.

FIGS. 14-19 illustrate examples of interactive procedure steps as displayed on a touch screen 188 of a client portable smart device 186. FIG. 14 is an example of a graphical user interface window 410 for the touch screen 188 of the portable smart device 186. The window 410 is directed to an in progress clearance procedure for an ammonia truck unloading station.

In FIG. 14, elements of the window 410 are labeled as follows:
 1. Step x of y in the Procedure
 2. Physical Location of Participating Asset
 3. Functional Description of Participating Asset
 4. Image of the Asset in Space
 5. Asset Name
 6. Graphical Progress Indicator/Procedure Percentage Complete Scale
 7. Scan Asset Tag Selector for Scan Initiation or Confirmation of Action
 8. Specific Action to be Taken
 9. Note/Photograph Selector
 10. Data Collection Selector Content Box for entering Specific Data (temperature, pressure, flow, etc. of an asset)
 11. Time/Date/User E Signature of operator for All Steps of Procedure Executed/Confirmed In the graphical user interface window 410 of FIG. 14, a photograph (4) of the asset of interest in the facility is displayed. An operator has assistance in locating the asset on which a process or maintenance is to be performed. The window 410 includes a soft button (7) that requests selection of the "scan asset tag." The desired tag has asset name identifier YA-VL-5841 as shown in large lettering. Upon locating the asset, an operator actuates the soft button "Scan Assist Tag" (7) on the window 410 on the touch screen 188. Thereafter, the camera 189 of the portable smart device 186 is activated for scanning.

Figure 15:
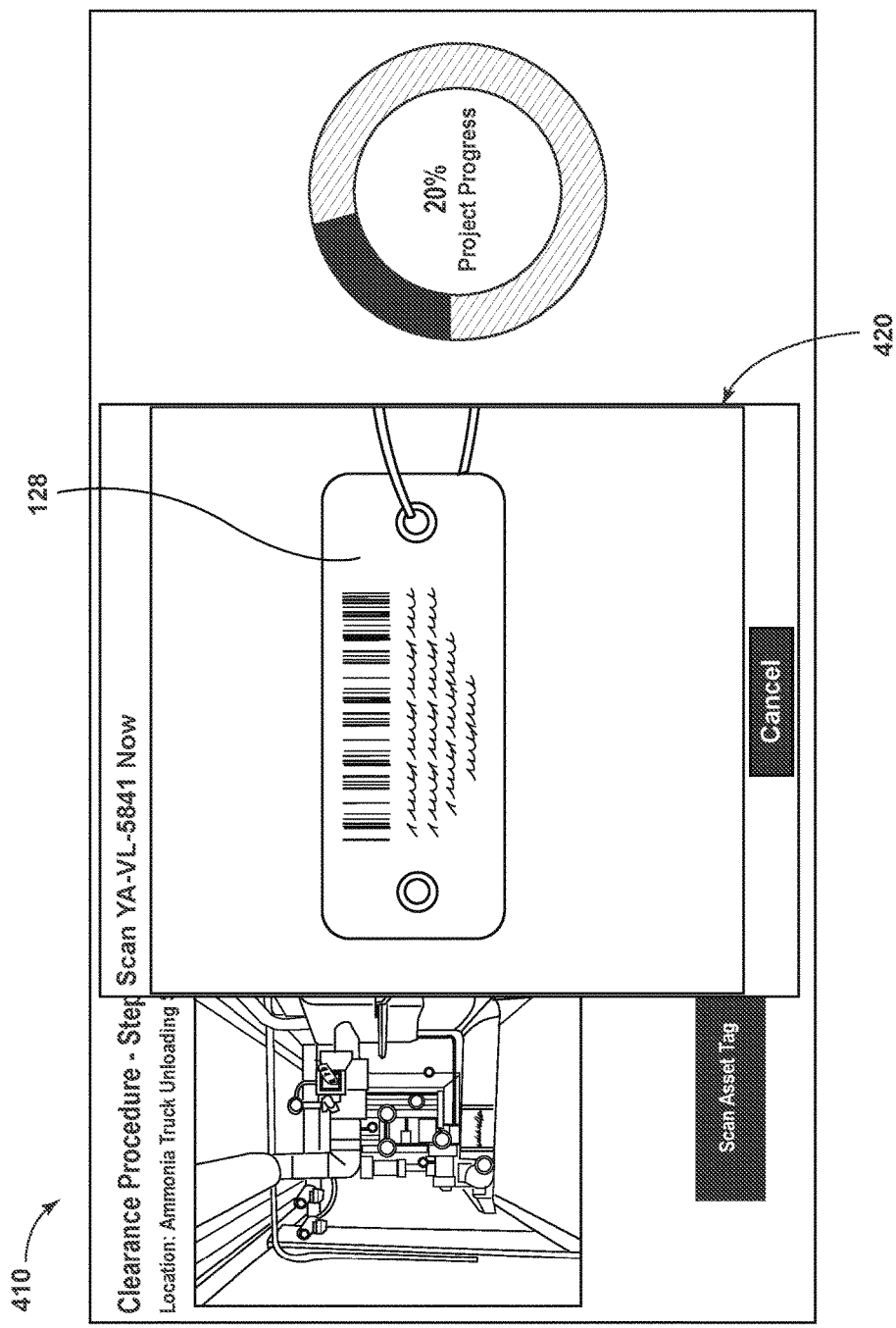
FIG. 15 is the window of FIG. 14 with a second window overlaying a portion of the graphical user interface for a subsequent procedural step.
Figure 16:
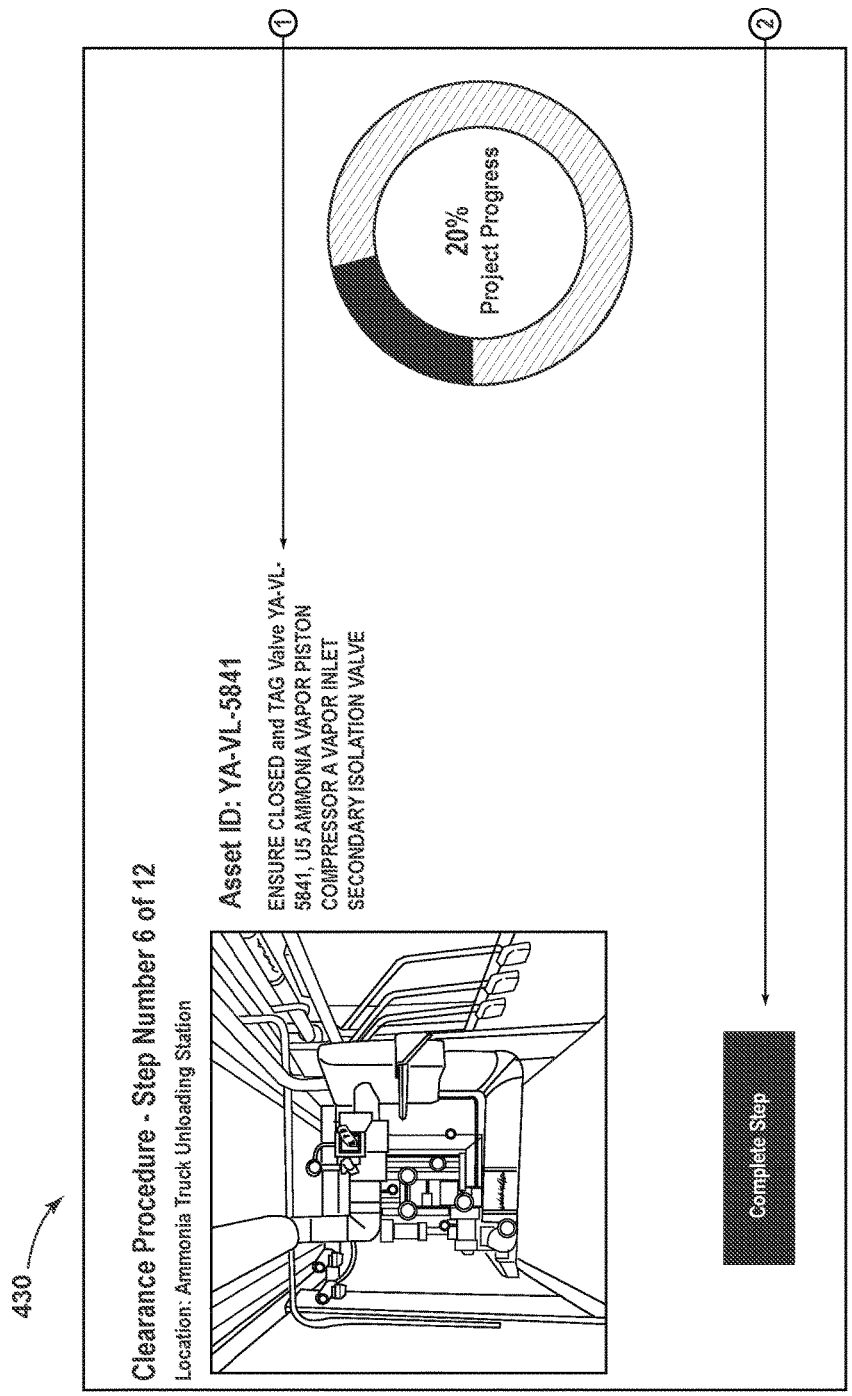
FIG. 16 is a window of a graphical user interface of a subsequent procedural step from the step shown in FIG. 15.

As shown in FIG. 15, the graphical user interface display page includes a camera image window 420 that overlays a portion of the window 410. The operator then moves the portable smart device 186 to locate the bar code in the camera image for scanning. In some embodiments, a QR code is scanned. Upon scanning a QR code within the camera image, the portable smart device 186 determines that the proper tag was scanned and the interactive procedure advances to the next step where window 430 is displayed in the graphical user interface (FIG. 16). In window 430, the Procedure Percentage Complete Scale (6) is updated in comparison to window 400, showing 20% complete.

The window 430 of FIG. 16 displays a message to "ENSURE CLOSED and TAG . . . " and displays a "Complete Step" selector (2) on the touch screen 188 for receiving an acknowledgement that the identified valve has been closed. An operator pressing the "Complete Step" selector (2) indicates completion.

In some embodiments, the interactive procedure requests additional evidence of completion. In such embodiments, an equipment log note page window 440 is displayed on the touch screen 188, as shown in FIG. 17. The operator must enter notes in a note area (1) and/or obtain a photograph of the asset, in this example a valve, using the camera 189 of the portable smart device 186 having an autofocus. The notes and photograph are stored in the portable smart device 186 to provide visual evidence of compliance with the interactive procedure step. Additional steps, such as touching a photograph box (2) in the equipment log note page window 440 in order to take a photograph with the camera 189 are not illustrated in detail herein. Touching a photograph box (2) in window 440 enables the camera 189 of the portable smart device 186. After a photograph is taken, the portable smart device 186 displays the window 440 again. The "Save" selector (3) on the touch screen 188 is pushed to save the pictures and text provided in the note area (1). In one embodiment, selecting the "Save" selector (2) in window 440 cause the portable smart device 186 to display window 430 on the touch screen 188. In window 430, an operator actuates the "Complete Step" selector (2) to advance to another step of the interactive procedure.

Returning to FIG. 15, when a QR code is scanned the portable smart device 186 determines whether the QR code matches the asset identifier of the step of the procedure being performed. In other words, the portable smart device 186 determines whether an incorrect asset has been scanned. When an incorrect asset is scanned, the portable smart device 186 displays window 450 (FIG. 18) on the touch screen 188. The window 450 includes an error message, for example "Incorrect QR Code. Please scan the correct asset tag to verify your location."

The window 450 includes a "Scan Asset Tag" selector or button for an operator to actuate and then scan the correct tag. The window 450 shown in FIG. 18 includes the location of the correct tag and the corresponding asset identifier to assist an operator in finding the correct tag. Upon actuating the "Scan Asset Tag" selector, the procedure advances and the portable smart device 186 displays the window 410 illustrated in FIG. 15, actuates the camera 189 for scanning a tag, and displays the overlying window 420.

Returning to the window 430 illustrated in FIG. 16, upon an operator actuating the "Complete Step" selector (2) to indicate completion of a step, an additional step is provided on the touch screen 188 of the portable smart device 186. Thereafter, additional steps of the procedure continue.

In the instance that a procedure is completed, actuating the "Complete Step" selector (2) in FIG. 16 advances the procedure to a window of the graphical user interface indicating that the procedure is complete. In some embodiments, the portable smart device 186 then displays a main menu or home page.

Figure 19:
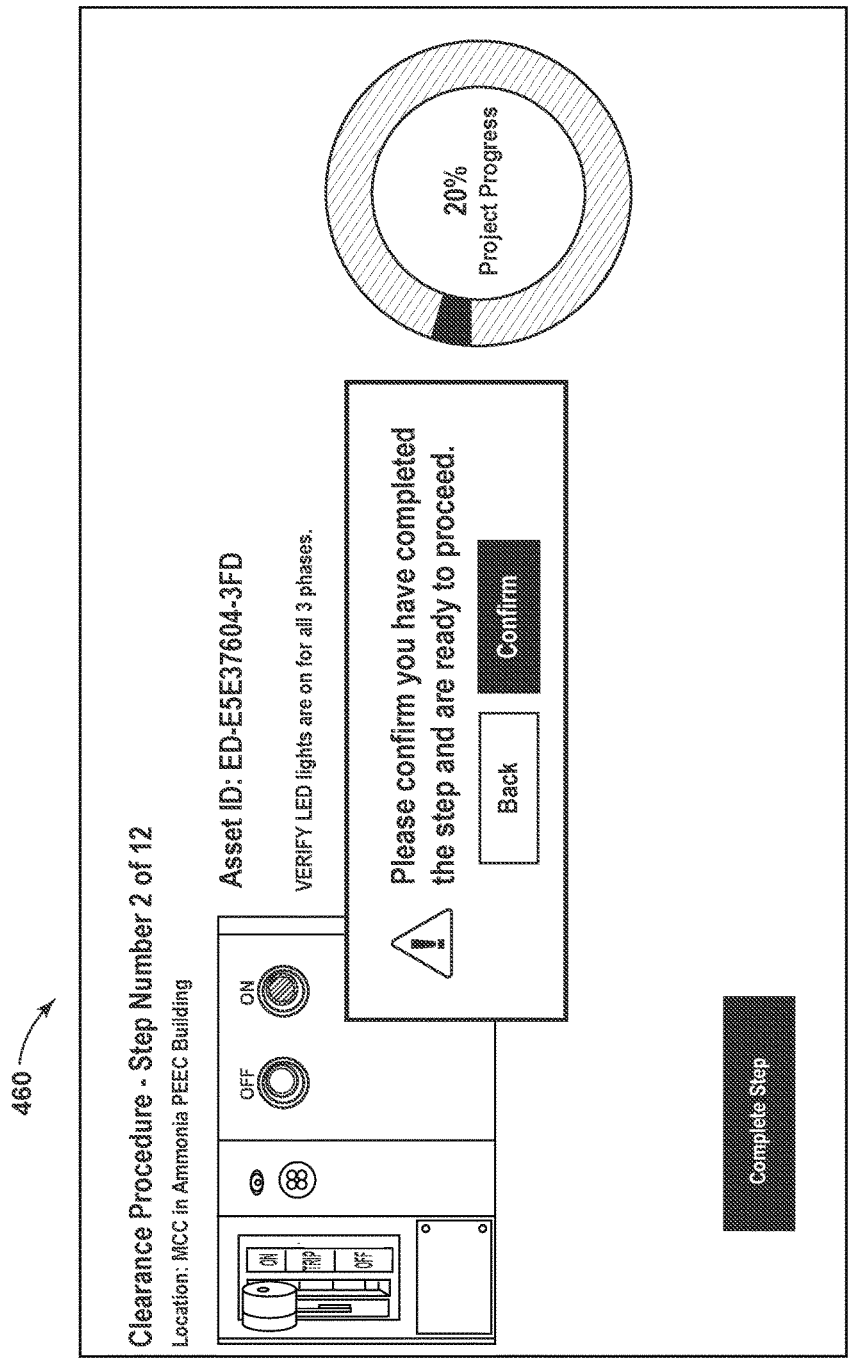
FIG. 19 is a window of a graphical user interface of a procedural step from a different procedure.

FIG. 19 illustrates window 460 of the graphical user interface provided on the touch screen display 188. The window 460 includes a dialog box 465 that includes "Back" and "Confirm" selection button 467 and 469, respectively and request to confirm that a procedure step is completed or whether the operator desires to go back to the beginning of the procedure step. Thus, the operator is provided a choice between returning to an instruction display window and completing the procedural step.

Upon completion of an interactive procedure and/or a group of interactive procedures at a facility, an operator returns to a control room, locker room, or other central location, bringing the portable smart device 186 to that location. At that location, the portable smart device 186 is synchronized with the client application interactive procedure system 170, for example, through a docking station or wireless synchronization. The synchronization enables the loading of the procedure data collected by the portable smart device 186 onto the client application interactive procedure system 170.

An administrator of the client application interactive procedure system 170 notes the completed procedures and determines new procedures to be loaded on the portable smart device 186 or procedures to be removed from the portable smart device 186.

Additional Embodiments

Besides providing photographs for locating an asset and written text explaining how to, for example, operate a valve or otherwise manipulate an asset, other approaches are contemplated. In one embodiment, a video is provided that illustrates and informs an operator how to perform the procedural step with the asset.

In some embodiments, a procedure includes utilizing a plurality of assets, and the procedural steps may operate the assets out of sequence.

In some embodiments, a timing occurs. For instance, in one embodiment the asset is a valve, and the valve must be opened for a predetermined time before a subsequent procedural step occurs. In one embodiment, the procedural step is opening a valve for a storage tank for a predetermined time delay that is sufficient to ensure that the storage tank is drained of liquid. The portable smart device 186 includes a timer or a timing function and delays display of the subsequent procedural step until the predetermined time has expired.

In one embodiment wherein an interactive procedure operates to decoke an oil facility, various procedure steps take many hours. The interactive procedure may last for multiple shifts. In some instances, the decoking requires the application of superheated hot oil for days/weeks. Thus, a portable smart device 186 at the end of a work shift is cataloged, so that the next shift starts when another operator receives the portable smart device 186 at the end of a different operator's shift. Thus, the interactive procedure includes a long time interval for decoking, which is determined and timed by the portable smart device 186 and in some instances, the client application interactive procedure system 170 also times out the procedure in addition to the portable smart device 186.

One interactive procedure may involve, for example, from 5 to 500 assets. Thus, a procedure may require multiple timing and usage of multiple portable smart devices 186. Further, timing of steps is shared or programmed between the portable smart devices 186 in some embodiments. In another procedure, two operators each have a portable smart device 186 and are performing a single procedure on the same asset or a group of related assets together. For instance, in one embodiment for a boiler pump or other asset, a sequence of steps occur at two or more locations. In this embodiment, WI-FI or another communication link, is provided near the boiler pump or other asset, so that the portable smart devices 186 are provided with real-time communication with each other via the client application interactive procedure system 170. In another embodiment, a bluetooth or other communication link is provided between the portable smart devices 186 to communicate therebetween and perform an interactive procedure. Thus, the interactive procedure is operated wherein a first operator with a first portable smart device 186 opens a valve or performs another step. The second operator with a second portable smart device 186, must wait until the second portable smart device receives an indication that the procedural step was performed and validated or confirmed by the first operator.

Thereafter, the second operator executes the next operation of the sequence. Upon confirmation of the next operation by the second operator, the second smart device 186 communicates with the first smart device 186 to inform the first operator. This real-time communication between the portable smart devices 186 ensures that the operators perform steps in proper sequence and prevents miscommunication between the operators.

While various procedural steps, such as closing/opening a valve or utilizing a power pen to determine no power are disclosed as a procedural step, other steps are contemplated. For example, a procedural step may include at least one from the group consisting of: a temperature value, a pressure value and a flow rate for the first asset. An input confirms completion of the first procedural step. A certain minimum or maximum value corresponds to a confirmation. An operator then takes a photograph of one or more from the group consisting of: a temperature gauge, a pressure gauge, and a flowmeter to provide a confirmation that the proper step has occurred.

While the disclosed embodiment shows a touch screen 188 with various soft buttons and similar selection mechanisms in a graphical user interface displayed on the touch screen 188, other arrangements that include push buttons, keypads, voice recognition, and other input and output mechanisms are contemplated.

Another embodiment contemplates using global positioning signals to determine a location for the selected asset having the first asset identifier and providing directions to the selected asset on the touch screen 188 of the portable smart device 186.

Besides providing an interactive procedure for assets, another method includes obtaining a procedure for a process including at least one specific asset by: linking the at least one specific asset with an asset identifier for the specific asset in an industrial facility 120, generating a step-by-step interactive procedure for the specific asset including photographs of the specific asset to enable identification thereof, storing the interactive procedure, and providing the procedure on a portable smart device 186 having a touch screen 188 as a display.

Thus, embodiments provide, among other things, a method and apparatus to perform an interactive procedure in an industrial facility. The interactive procedure requires confirmation of the various procedure steps performed. The interactive procedure utilizes a portable smart device 186 to assist in locating assets and properly performing the procedural step for an asset. Various features and advantages of one or more embodiments are set forth in the following claims.

What is claimed is:

1. A method of performing an interactive procedure with a portable smart device utilizing assets that include asset identifiers in an industrial facility, the method comprising:
   providing indicia and photographs on a display of the portable smart device for procedural steps of a procedure to be performed on an industrial facility;
   upon the portable smart device receiving an input to begin the procedure, displaying on the portable smart device a first procedural step for a location of a first asset having a first asset identifier, and a photograph that includes the first asset;
   upon the portable smart device receiving an input to provide a scan, scanning for the first asset identifier of the first asset, reading the scanned asset identifier and determining whether the scanned asset identifier matches the first asset identifier, and
   upon the scanned asset identifier matching the first asset identifier, displaying a second procedural step on the portable smart device for an action by the first asset and displaying a request to confirm that the second procedural step for the first asset is completed; and
   upon the portable smart device receiving an input that confirms execution of the second procedural step, providing indicia and a photograph on the display of the portable smart device for a third procedural step to be performed.

2. The method according to claim 1, wherein the indicia and/or the photograph on the display of the portable device for the third procedural step includes a second asset having a second asset identifier, the method further including:
   upon the portable smart device receiving an input to provide a scan, scanning for the second asset identifier of the second asset, reading the scanned asset identifier and determining whether the scanned asset identifier matches the second asset identifier, and
   upon the scanned asset identifier matching the second asset identifier, displaying a fourth procedural step on the portable smart device for an action by the second asset and displaying a request to confirm that the fourth procedural step for the second asset is completed.

3. The method according to claim 1, wherein, in addition to confirming that a respective one of the procedural steps is completed, each of the procedural steps is displayed without providing an indication of a subsequent one of the procedural steps to assist in ensuring that the procedural step is not skipped.

4. The method according to claim 3, the method further including displaying a percentage of completion of the procedural steps of the procedure, and the confirming that the procedural step is completed includes actuating a selector shown on a touch screen of the display of the portable smart device.

5. The method according to claim 1, wherein, upon confirming that the procedural step is completed, a timing occurs so that the next procedural step is not displayed on the portable smart device until a predetermined time delay is completed.

6. The method according to claim 5, wherein the procedural step is opening a valve for a storage tank, and the predetermined time delay is sufficient to ensure that the storage tank is drained of liquid.

7. The method according to claim 1, wherein the input that confirms completion of the first procedural step includes a camera of the portable smart device having an autofocus that is actuated to obtain a photograph of the asset for storage in the portable smart device to confirm that the first procedural step is completed.

8. The method according to claim 7, wherein the asset that is photographed is a temperature gauge.

9. The method according to claim 2, wherein the procedure steps includes multiple out of sequence procedure steps utilizing the first asset and the second asset.

10. The method according to claim 1, including
    generating a report with the portable smart device documenting the procedure performed; and
    synchronizing the portable smart device with a client application interactive procedure system to load the report into a media storage.

11. The method according to claim 1, including
    synchronizing the portable smart device with a client application interactive procedure system; and
    loading one or more procedures onto the portable smart device.

12. The method according to claim 1, wherein the portable smart device is a first portable smart device, the method including
- providing a second portable smart device in real-time communication with the first portable smart device,
- wherein the interactive procedure includes, upon the first portable smart device receiving an input that confirms execution of the second procedural step, providing instructions for a subsequent procedural step to the second portable smart device while delaying providing indicia and a photograph to the first portable smart device until confirmation that the subsequent procedural step is completed by the second portable smart device, and
- wherein the industrial facility includes a piping installation and the assets include valves.

13. The method according to claim 1, wherein the input that confirms completion of the first procedural step includes at least one from the group consisting of: a temperature value, a pressure value and a flow rate for the first asset.

14. The method according to claim 1, wherein the photograph that includes the first asset includes a video that illustrates the second procedural step to inform an operator how to perform the second procedural step with the first asset.

15. The method according to claim 1, wherein the portable smart device includes a RFID reader and a camera for reading the first asset identifier, the first asset identifier including a QR code.

16. The method according to claim 1, wherein, upon the portable smart device determining that the scanned identifier does not match the first asset identifier, providing an indication on the portable smart device that an incorrect asset has been scanned.

17. The method according to claim 16, including using global positioning signals to determine a location for the first asset having the first asset identifier and providing directions to the first asset on the display of the portable smart device.

18. A portable smart device for performing an interactive procedure utilizing assets that include asset identifiers in an industrial facility, the portable smart device comprising:
- a processor having a memory device;
- a camera for scanning images and for obtaining photographs;
- a display including a touch screen for indicia and/or photographs of procedural steps of a procedure to be performed on an industrial facility;

wherein the processor is configured to:
- upon the portable smart device receiving an input to begin the procedure, displaying on the portable smart device a first procedural step for a location of a first asset having a first asset identifier, and a photograph that includes the first asset;
- upon the portable smart device receiving an input to provide a scan, scanning for the first asset identifier of the first asset, reading the scanned asset identifier and determining whether the scanned asset identifier matches the first asset identifier,
- upon the scanned asset identifier matching the first asset identifier, displaying a second procedural step on the portable smart device for an action by the first asset and displaying a request to confirm that the second procedural step for the first asset is completed by the portable smart device; and
- upon the portable smart device receiving an input that confirms completion of the second procedural step, providing indicia and/or a photograph on the display of the portable smart device for a third procedural step to be performed.

19. The portable smart device for performing an interactive procedure according to claim 18, wherein the interactive procedure is one from the group consisting of: a maintenance procedure, a clearance procedure, a testing procedure and an operating procedure for an industrial facility that includes piping and equipment, and wherein the photograph that includes the first asset is provided from point cloud data.

20. The portable smart device according to claim 18, wherein the processor is further configured to:
- generate a report regarding the procedure performed;
- synchronize the portable smart device with a client application interactive procedure system to load the report into a media storage; and
- load one or more procedures from a procedure database of the client application interactive procedure system onto the portable smart device.

* * * * *